United States Patent
Zuo et al.

(10) Patent No.: US 11,188,689 B2
(45) Date of Patent: Nov. 30, 2021

(54) ASPHALTENE PHASE INSTABILITY ANALYSIS IN GAS CHARGES INTO OIL RESERVOIRS

(71) Applicant: Schlumberger Technology Corporation, Sugar Land, TX (US)

(72) Inventors: Youxiang Zuo, Burnaby (CA); Shu Pan, Edmonton (CA); Yi Chen, Sugar Land, TX (US); Kang Wang, Beijing (CN); Oliver C. Mullins, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 203 days.

(21) Appl. No.: 15/196,128

(22) Filed: Jun. 29, 2016

(65) Prior Publication Data

US 2018/0004863 A1    Jan. 4, 2018

(51) Int. Cl.
*G06G 7/48*    (2006.01)
*G06F 30/20*   (2020.01)
*E21B 49/08*   (2006.01)
*G06F 111/10*  (2020.01)

(52) U.S. Cl.
CPC ............ *G06F 30/20* (2020.01); *E21B 49/082* (2013.01); *G06F 2111/10* (2020.01)

(58) Field of Classification Search
CPC .......... E21B 49/08; E21B 43/16; E21B 47/00; G01V 9/00; G06F 17/11; C09K 8/62
See application file for complete search history.

(56) References Cited

U.S. PATENT DOCUMENTS 7,920,983 B1 * 4/2011 Peleg .................. G01M 3/2807
                                                             137/1
2005/0255159 A1 * 11/2005 Hyers ..................... A61K 33/42
                                                             424/484

(Continued)

OTHER PUBLICATIONS

Zuo et al. Advances in the Flory-Huggins-Zuo Equation of State for Alphaltene Gradients and Formation Evaluation Energy & Fuels 2013, 27, pp. 1722-1735.*

(Continued)

*Primary Examiner* — Rehana Perveen
*Assistant Examiner* — Cuong V Luu
(74) *Attorney, Agent, or Firm* — Trevor G. Grove

(57) ABSTRACT

A method includes placing a downhole acquisition tool in a wellbore in a geological formation containing a reservoir fluid. The method includes performing downhole fluid analysis using the downhole acquisition tool to determine at least one measurement of the reservoir fluid. The method includes using a processor to estimate at least one fluid component property by using an equation of state based at least in part on the at least one measurement of the reservoir fluid and to simulate a diffusion process using a diffusion model that takes into account the at least one estimated fluid property to generate a composition path. The method includes using a processor to estimate one or more phase envelopes based in part on the at least one fluid property and compare the one or more phase envelopes with the composition path. The method includes outputting a visualization identify potential areas of asphaltene instability.

19 Claims, 12 Drawing Sheets

(56) References Cited

U.S. PATENT DOCUMENTS

| | | | | |
|---|---|---|---|---|
| 2009/0070085 | A1* | 3/2009 | Gullapalli | G06F 17/5009 |
| | | | | 703/10 |
| 2010/0023269 | A1* | 1/2010 | Yusti | E21B 43/00 |
| | | | | 702/12 |
| 2010/0108542 | A1* | 5/2010 | Gruenwald | F17C 11/005 |
| | | | | 206/0.7 |
| 2010/0179076 | A1* | 7/2010 | Sullivan | C09K 8/512 |
| | | | | 507/214 |
| 2010/0184630 | A1* | 7/2010 | Sullivan | C09K 8/52 |
| | | | | 507/216 |
| 2011/0003720 | A1* | 1/2011 | Sullivan | C09K 8/08 |
| | | | | 507/215 |
| 2011/0303408 | A1* | 12/2011 | Hartshorne | E21B 21/068 |
| | | | | 166/250.12 |
| 2012/0232859 | A1* | 9/2012 | Pomerantz | G01V 99/005 |
| | | | | 703/2 |
| 2013/0289961 | A1* | 10/2013 | Ray | E21B 47/00 |
| | | | | 703/10 |
| 2014/0200810 | A1* | 7/2014 | Zuo | E21B 49/10 |
| | | | | 702/13 |
| 2015/0006084 | A1* | 1/2015 | Zuo | E21B 49/00 |
| | | | | 702/13 |
| 2015/0073762 | A1* | 3/2015 | Patacchini | E21B 43/16 |
| | | | | 703/10 |
| 2015/0136962 | A1* | 5/2015 | Pomerantz | E21B 47/00 |
| | | | | 250/255 |
| 2015/0167456 | A1* | 6/2015 | Irani | E21B 47/102 |
| | | | | 73/152.23 |
| 2016/0047208 | A1 | 2/2016 | Chen et al. | |
| 2016/0146004 | A1 | 5/2016 | Kang et al. | |

OTHER PUBLICATIONS

Painter et al. Asphaltene Aggregation and Solubility Energy & Fuels 2015, 29, pp. 2120-2133.*

Ellison et al. The Physical Chemistry of Wax, Hydrates, and Asphaltene Offshore Technology Conference, 2000.*

Mullins et al. Clusters of Asphaltene Nanoaggregates Observed in Oilfield Reservoirs Energy & Fuels, 27, 2013, pp. 1752-1761.*

Darwish et al. Computation of Phase Stability Limits and Critical Points for Binary Systems Containing Cyclo- and Normal-Alkanes Using the NRTL Model Scientific Cooperation International Workshops on Engineering Branches, Koc University, Turkey (Year: 2014).*

Chen et al. Dynamics of Tar Mat Formation Due to Asphaltenes Accumulation Under Gas Charge in Reservoirs Offshore Technology Conference (Year: 2015).*

Mullins et al. Characterization of Asphaltene Transport Over Geologic Time Aids in Explaining the Distribution of Heavy Oils and Solid Hydrocarbons in Reservoir SPE 170730 (Year: 2014).*

Painter et al. Phase Behavior of Bituminous Materials American Chemical Society, Energy & Fuels 29, 2015 pp. 7048-7057 (Year: 2015).*

Painter et al. Asphaltene Aggregation and Solubility Energy & Fuels 2015, 29, pp. 2120-2133 (Year: 2015).*

Fahad Al-Sadoon Prediction Of Stability Limits For Binary and Ternary Systems Using the NRTL Liquid Phase Model American University of Sharjah College of Engineering, United Arab Emirates, Jan. 2013 (Year: 2013).*

Zuo et al., Investigation of density inversion induced by gas charges into oil reservoirs using diffusion equations. Energy 100, 2016, pp. 199-216.

Krishna et al., The Maxwell-Stefan Approach to Mass Transfer. Chemical Engineering Science. 1997, pp. 861-911. vol. 52, No. 6. Great Britain.

Peng et al., A Rigorous Method for Predicting the Critical Properties of Multicomponent Systems from an Equation of State. AlChE Journal, 1977, pp. 137-144, vol. 23, No. 2.

Michelsen, M. L., The Isothermal Flash Problem. Part I. Stability. Fluid Phase Equilibria 1982, pp. 1-19. vol 9. The Netherlands.

Michelsen, M. L. Calculation of phase envelopes and critical points for multicomponent mixtures. Fluid Phase Equilibria 1980, pp. 1-10. vol 4. The Netherlands.

Peng et al., A New Two-Constant Equation of State. Industrial Engineering Chemistry Fundamentals 1976, pp. 59-64. vol 15, No. 1.

Zuo et al., A Simple Relation between Densities and Solubility Parameters for Live Reservoir Fluids. Journal of Chemical and Engineering Data 2010, pp. 2964-2969. vol 55, No. 9.

Zuo et al., Advances in the Flory-Huggins-Zuo Equation of State for Asphaltene Gradients and Formation Evaluation Energy & Fuels 2013, pp. 1722-1735. vol. 27, No. 4.

Mullins, O.C. The Modified Yen Model. Energy & Fuels 2010 . . . pp. 2179-2207. vol. 24.

Krooss, B. M. Experimental Investigation of the Molecular Migration of C1—C6 Hydrocarbons: Kinetics of Hydrocarbon release from Source Rocks. Advances in Organic Geochemistry. 1988, pp. 513-523. vol. 13, Nos. 1-3. Great Britain.

Sheikha et al., An Inverse Solution Methodology for Estimating the Diffusion Coefficient of Gases in Athabasca Bitumen from Pressure-Decay Data. Journal of Petroleum Science and Engineering. 2006, pp. 189-202. vol. 53.

Pisani, L. Simple Expression for the Tortuosity of Porous Media. Transp Porous Med. 2011, pp. 193-203. vol. 88.

Chen et al., Dynamics of Tar Mat Formation due to Asphaltenes Accumulation under Gas Charge in Reservoirs. Presented at the Offshore Technology Conference, Houston, TX, USA, May 4-7, 2015. OTC-25752-MS. 12 pages.

Vella et al., Gravity Currents in a Porous Medium at an Inclined Plane. Journal of Fluid Mechanics. 2006, pp. 353-362. vol. 55. Cambridge University Press, United Kingdom.

Prausnitz et al., Molecular Thermodynamics of Fluid Phase Equilibria, 1999, pp. 312-327, 3rd ed. Prentice Hall PTR, Upper Saddle River, NJ.

Dumont et al., Permeable tar mat formation within the context of novel asphaltene science, SPE 163292, Kuwait International Petroleum Conference and Exhibition, Kuwait, Dec. 10-12, 2012. 14 pages.

Mullins et al., Clusters of Asphaltene Nanoaggregates Observed in Oil Reservoirs. Energy & Fuels. 2013, pp. 1752-1761. vol. 27.

Pan et al., Tar Mat Formation Prediction in Late-Charge Reservoirs. U.S. Appl. No. 62/234,433, filed Sep. 29, 2015.

* cited by examiner

ASPHALTENE PHASE INSTABILITY ANALYSIS IN GAS CHARGES INTO OIL RESERVOIRS

BACKGROUND

This disclosure relates to determining one or more dynamic processes for a reservoir in a geological formation occurring over geological time.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Reservoir fluid analysis may be used to better understand a hydrocarbon reservoir in a geological formation. Indeed, reservoir fluid analysis may be used to measure and model fluid properties within the reservoir to determine a quantity and/or quality of formation fluids—such as liquid and/or gas hydrocarbons, condensates, drilling muds, and so forth—that may provide much useful information about the reservoir, such as where areas of asphaltene instability occur. This may allow operators to better assess the economic value of the reservoir, obtain reservoir development plans, and identify hydrocarbon production concerns for the reservoir. Numerous possible reservoir models may be used to describe the reservoir. For a given reservoir, however, different possible reservoir models may have varying degrees of accuracy. The accuracy of the reservoir model may impact plans for future well operations, such as enhanced oil recovery, logging operations, and dynamic formation analyses. As such, the more accurate the reservoir model, the greater the likely value of future well operations to the operators producing hydrocarbons from the reservoir.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method includes placing a downhole acquisition tool in a wellbore in a geological formation, where the wellbore or the geological formation, or both, contain a reservoir fluid. The method includes performing downhole fluid analysis using the downhole acquisition tool in the wellbore to determine at least one measurement associated with the reservoir fluid. The method includes using a processor to estimate at least one fluid component property by using an equation of state based at least in part on the at least one measurement associated with the reservoir fluid and to simulate a diffusion process using a diffusion model that takes into account the at least one estimated fluid property to generate a composition path. The method includes using a processor to estimate one or more phase envelopes based at least in part on the at least one fluid property and compare the one or more phase envelopes with the composition path. The method includes using a processor to output a visualization based at least in part on the comparison of the phase envelopes with the composition path to identify potential areas of asphaltene instability.

In another example, one or more tangible, non-transitory, machine-readable media include instructions to receive at least one measurement representative of a portion of a reservoir fluid as analyzed by a data acquisition tool in a wellbore in a geological formation within a hydrocarbon reservoir. The instructions estimate at least one fluid component property by using an equation of state. The instructions simulate a diffusion process by executing a diffusion model that takes into account the at least one estimated fluid property to generate a composition path. The instructions estimate one or more phase envelopes based at least in part on the at least one fluid property. The instructions compare the one or more phase envelopes with the composition path, and output a visualization based at least in part on the comparison of the phase envelopes with the output to identify potential areas of asphaltene instability.

In another example, a system a downhole acquisition tool housing including a plurality of sensors configured to measure at least one fluid property of a reservoir fluid within a geological formation of a hydrocarbon reservoir; and a data processing system configured to predict areas of potential asphaltene instability from a visualization that depends at least in part on an instability analysis associated with the at least one measured fluid property; wherein the data processing system comprises one or more tangible, non-transitory, machine-readable media comprising instructions. The instructions estimate at least one fluid component property by using a suitable equation of state, and simulate a diffusion process using a diffusion model that takes into account the at least one estimated fluid property to generate a composition path. The instructions estimate one or more phase envelopes based at least in part on the at least one fluid property. The instructions compare the one or more phase envelopes with the composition path. The instructions output a visualization based at least in part on the comparison of the phase envelopes with the output.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
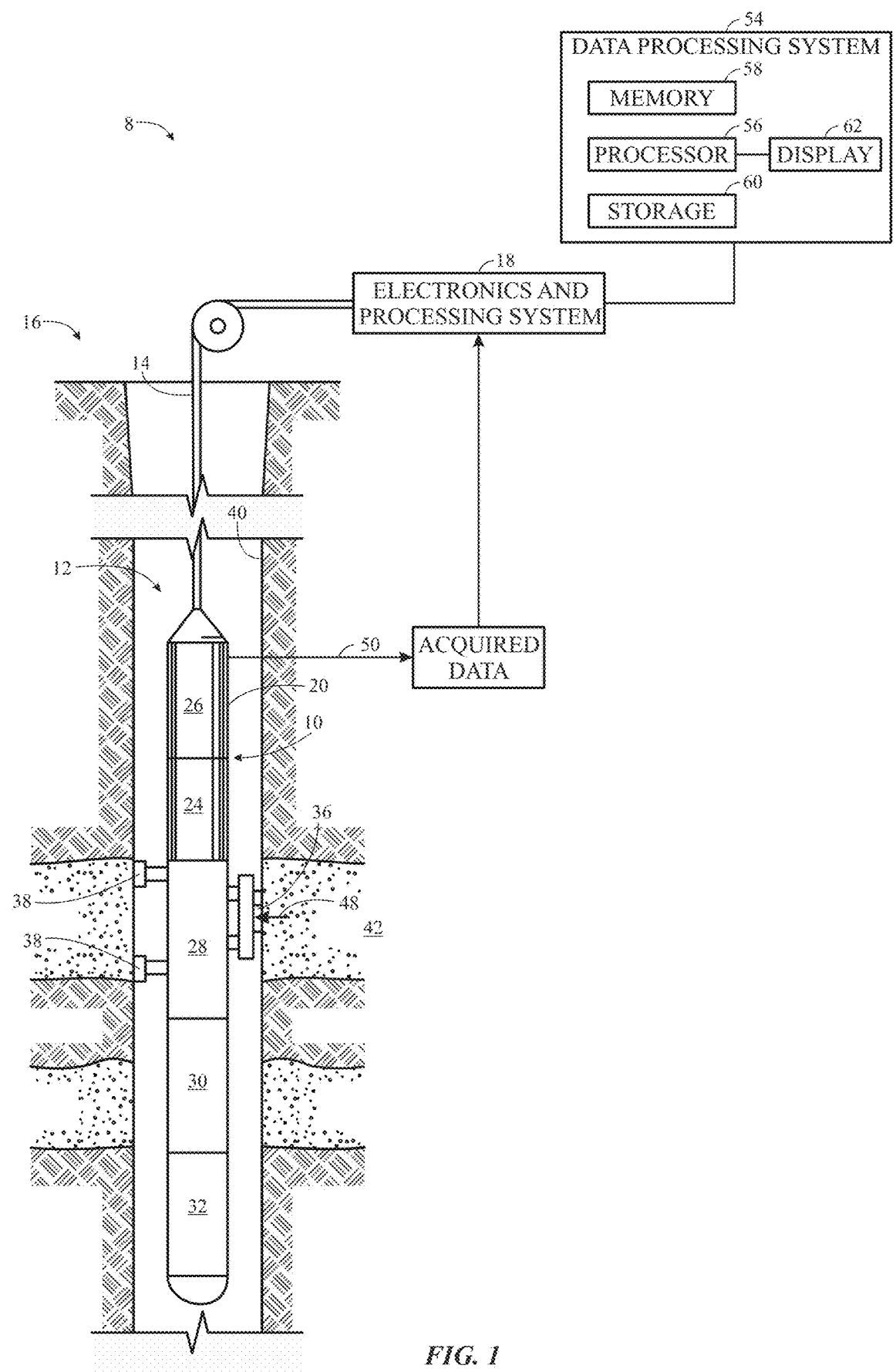
FIG. 1 is a schematic diagram of a wellsite system that may employ downhole fluid analysis for determining fluid gradients of a reservoir, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to systems and methods for reservoir characterization, such as performing asphaltene phase analysis to identify areas of instability in reservoirs. Petroleum includes a complex mixture of hydrocarbons of various molecular weights, plus other organic compounds. The molecular composition of petroleum varies widely from formation to formation. The proportion of hydrocarbons in the mixture is highly variable and ranges from as much as 97 percent by weight in the lighter oils to as little as 50 percent in the heavier oils and bitumens. The hydrocarbons in petroleum are mostly alkanes (linear or branched), cycloalkanes, aromatic hydrocarbons, or more complicated chemicals like asphaltenes. The other organic compounds in petroleum may contain carbon dioxide ($CO_2$), nitrogen, hydrogen sulfide ($H_2S$), oxygen, and sulfur, and trace amounts of metals such as iron, nickel, copper, and vanadium.

Acquisition and analysis representative of formation fluids downhole in delayed or real time may be used in reservoir modeling. A reservoir model based on downhole fluid analysis may predict or explain reservoir characteristics such as, but not limited to, connectivity, productivity, life-cycle stages, type and timing of hydrocarbon, hydrocarbon contamination, reservoir fluid dynamics, composition, and phase. Over the life of the reservoir, reservoir fluids such as oil, gas, condensates may behave dynamically in the reservoir. The reservoir fluids may flow (e.g., diffuse) into and out of the reservoir and/or biodegrade. This may result in spatial variations in the reservoir fluids throughout the reservoir, which may appear as fluid gradients in the composition characteristics of the reservoir fluids. For example, a concentration of compositional components of the reservoir fluid (e.g., gas, condensates, asphaltenes, etc.) may or may not vary along a vertical depth of the reservoir.

FIG. 1 depicts an example of a hydrocarbon reservoir 8 that may use a wireline downhole tool 10 to employ the systems and techniques described herein. The downhole tool 10 is inserted into a wellbore 12 located within the hydrocarbon reservoir 8. For example, in the illustrated embodiment, the downhole tool 10 is suspended in the wellbore 12 from the lower end of a multi-conductor cable 14 that is spooled on a winch at surface 16. The cable 14 is communicatively coupled to an electronics and processing system 18. The downhole tool 10 includes an elongated body 20 that houses modules 24, 26, 28, 30, and 32, that provide various functionalities including fluid sampling, fluid testing, operational control, and communication, among others. For example, the modules 24 and 26 may provide additional functionality such as fluid analysis, resistivity measurements, operational control, communications, coring, and/or imaging, among others. As should be noted, other data acquisition tools may be used to employ the systems and techniques described herein. For example, in certain embodiments, the data acquisition tool may be a logging while drilling tool, seismic acquisition tool, or the like.

In the example shown in FIG. 1, the module 28 is a fluid communication module 28 that has a selectively extendable probe 36 and backup pistons 38 that are arranged on opposite sides of the elongated body 20. The extendable probe 36 selectively seals off or isolates selected portions of a wellbore wall 40 of the wellbore 12 to fluidly couple to the adjacent formation 42 and/or to draw fluid samples (e.g., reservoir fluid 48) from the formation 42. The probe 36 may include a single inlet or multiple inlets designed for guarded or focused sampling. The reservoir fluid 48 may be expelled to the wellbore through a port in the body 20 or the reservoir fluid 48 may be sent to one or more fluid sampling modules 30 and 32. The fluid sampling modules 30 and 32 may include sample chambers that store the formation fluid. In the illustrated example, the electronics and processing system 18 and/or a downhole control system control the extendable probe assembly 36 and/or the drawing of a fluid sample from the formation 42.

The modules 26, 24, 28, 30, 32 include sensors that may collect and transmit data 50 associated with the fluid properties and the composition of the reservoir fluid 52 to the electronics and processing system 18 at the surface 16, where the data 50 may be stored and processed in a data processing system 54 of the electronics and processing system 18. The data 50 may include a plurality of measurements representative of information associated with, for example, reservoir temperature, pressure, compositions, the gas-to-oil ratio (GOR), asphaltene content, density, viscosity, optical density, or a combination thereof of the reservoir fluid 48.

The data processing system 54 may include a processor 56, memory 58, storage 60, and/or display 62. The memory 58 may include one or more tangible, non-transitory, machine readable media collectively storing one or more sets of instructions for operating the downhole tool 10, calculating and estimating fluid properties of the reservoir fluid 48, modeling the fluid behaviors using, for example, the equation of state models, and/or identifying certain reservoir realization scenarios associated with observed fluid behaviors. The fluid properties calculated and/or estimated by the equation of state models may include partial molar volume, molar mass, partial density, initial conditions, boundary conditions, solubility parameters, or a combination thereof. The memory 58 may simulate diffusion processes by utilizing a diffusion model to generate a diffusion composition path (e.g., output) at varying depths. The memory 58 may store comparison rules for comparing phase envelopes with the generated diffusion composition path and/or output. The memory 58 may store mixing rules associated with compositional characteristics of the reservoir fluid 48, equation of state (EOS) models for equilibrium and dynamic fluid behaviors, reservoir realization scenarios (e.g., biodegradation, gas/condensate charge into oil, $CO_2$ charge into oil, fault block migration/subsidence, convective currents, among others), and any other information that may be used to determine the effects of the composition and fluid behaviors of the reservoir fluid 48 on reservoir productivity, and provide information about reservoir connectivity. The memory 58 may store instructions to generate a user visualization based at least in part on a comparison between the phase envelopes and the diffusion composition path. The data processing system 54 may use the fluid property and composition information of the data 50 to identify the plausible realization scenarios for the reservoir 8, as discussed in further detail below. In certain embodiments, the data processing system 54 may apply filters to remove noise from the data 50.

To process the data 50, the processor 56 may execute instructions stored in the memory 58 and/or storage 60. For example, the instructions may cause the processor to estimate fluid and compositional parameters of the reservoir fluid 48, reservoir fluid gradients, diffusion composition paths, equilibrium and/or dynamic state of the reservoir fluid 48, and realization scenarios associated with the fluid and compositional parameters and diffusion composition paths. As such, the memory 58 and/or storage 60 of the data processing system 54 may be any suitable article of manufacture that can store the instructions. By way of example, the memory 58 and/or the storage 60 may be read-only memory (ROM), random-access memory (RAM), flash memory, an optical storage medium, or a hard disk drive. The display 62 may be any suitable electronic display that can display information (e.g., logs, tables, cross-plots, reservoir maps, etc.) relating to properties of the well as measured by the downhole tool 10 and the plausible realization scenarios, including diffusion processes, associated with the reservoir 8. It should be appreciated that, although the data processing system 54 is shown by way of example as being located at the surface 16, the data processing system 54 may be located in the downhole tool 10. In such embodiments, some of the data 50 may be processed and stored downhole (e.g., within the wellbore 12), while some of the data 50 may be sent to the surface 16 (e.g., in real time). In certain embodiments, the data processing system 54 may use information obtained from petroleum system modeling operations, ad hoc assertions from the operator, empirical historical data (e.g., case study reservoir data) in combination with or lieu of the data 50 to determine plausible realization scenarios, including diffusion processes, occurring within the reservoir 8.

Figure 2:
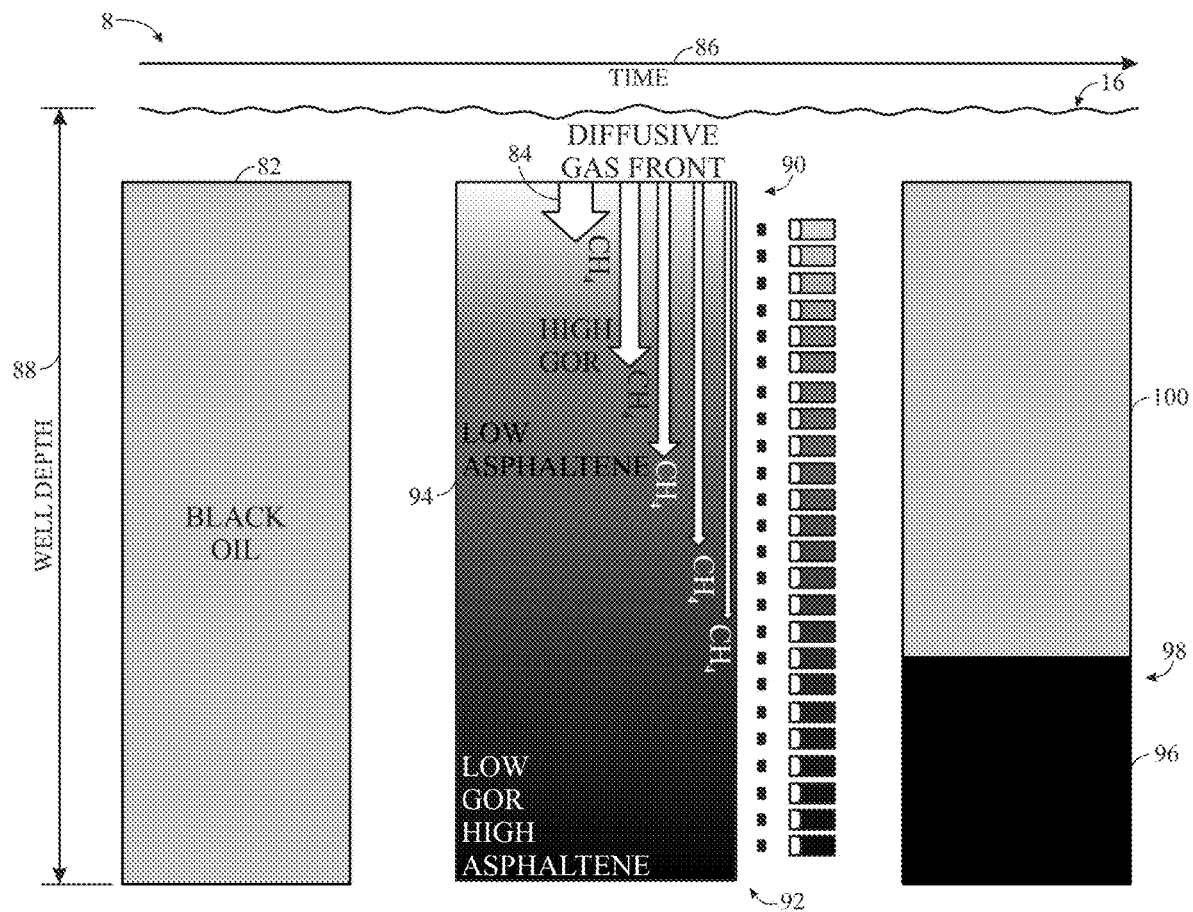
FIG. 2 is a diagram of an example of a reservoir undergoing a gas diffusion realization scenario.

As discussed above, the data 50 from the downhole tool 10 may be analyzed with the equation of state (EOS) models to determine how gradients and diffusion processes in reservoir fluid compositions are affected by various dynamic processes occurring within the reservoir 8. The dynamic processes for the reservoir 8 may include gas/condensate charge, biodegradation, convective currents, fault block migration, and subsidence, among others. Gas charges into the reservoir 8 may result in asphaltene phase instability because addition of gas decreases the oil solubility parameters and lowers solvency capacity of the oil to dissolve asphaltenes. FIG. 2 illustrates an embodiment of a realization scenario that may occur within the reservoir 8. Moving from left to right, the diagram in FIG. 2 illustrates the reservoir 8 saturated with immature oil 82 (e.g., black oil) and charged with gas 84 over time 86. The immature oil 82, also known as heavy/black oil, generally has a high concentration of high molecular weight hydrocarbons (e.g., asphaltenes, resins, $C_{60+}$) compared to mature oil (e.g., light oil, gas), which has high concentrations of low molecular weight aliphatic hydrocarbons (e.g., methane ($CH_4$), ethane ($C_2H_6$), propane ($C_3H_8$), $C_4$, $C_5$, $C_{6+}$etc.). The longer the reservoir fluid (e.g., the reservoir fluid 48) is within the formation 42, certain high molecular weight hydrocarbons found in the immature oil 82 may breakdown into the low molecular weight aliphatic hydrocarbons that make up the mature/light oil. Additionally, over time, source rock (e.g., portion of formation 42 having hydrocarbon reserve) may be buried under several layers of sediment. As the sediment layers increase, a depth 88 of the source rock, reservoir temperature, and reservoir pressure also increase. The increased temperatures and pressures favor the generation of light hydrocarbons, which may enter the reservoir.

Over time, the low molecular weight aliphatic hydrocarbons (e.g., gas 84) may be expelled from the source rock and travel through a high-permeability streak in the formation to the top of the reservoir unit. As shown in the middle diagram in FIG. 2, the gas 84 diffuses down into the reservoir 8 from top 90 to bottom 92, thereby charging the immature oil 82 with the gas 84. Late charge of gas 84 (e.g., diffusion of gas after the reservoir 8 has been saturated with immature oil) into the immature oil 82 destabilizes the reservoir 8, resulting in a fluid gradient for several fluid properties of the immature oil 82. For example, the late charge of gas 84 may cause fluid gradients in API gravity, gas-to-oil ratio (GOR), saturation pressure (Psat), and combinations thereof of the immature oil 82. As shown in the middle diagram in FIG. 2, a GOR toward the top 90 is higher compared to a GOR toward the bottom 92. In addition, asphaltenes 94 are generally insoluble in the gas 84. Therefore, increased concentration of the gas 84 toward the top 90 of the reservoir 8 may cause the asphaltenes 94 to phase separate. Alternatively, the asphaltenes 94 may diffuse ahead of the gas front, and flow towards the bottom 92 (e.g., when the asphaltenes do not phase separate). Diffusion of the asphaltenes 94 ahead of the gas front may yield mass density inversions and gravity currents (convective currents), which may result in bitumen deposition upstructure and/or tar mats 96 at the bottom 92 of the reservoir 8. For example, a flow of asphaltenes 94 to the bottom 92 may lead to a low concentration of asphaltenes 94 toward the top 90 compared to a concentration of asphaltenes 94 toward the bottom 92, resulting in a concentration gradient for the asphaltenes 94 in the reservoir 8.

Figure 3:
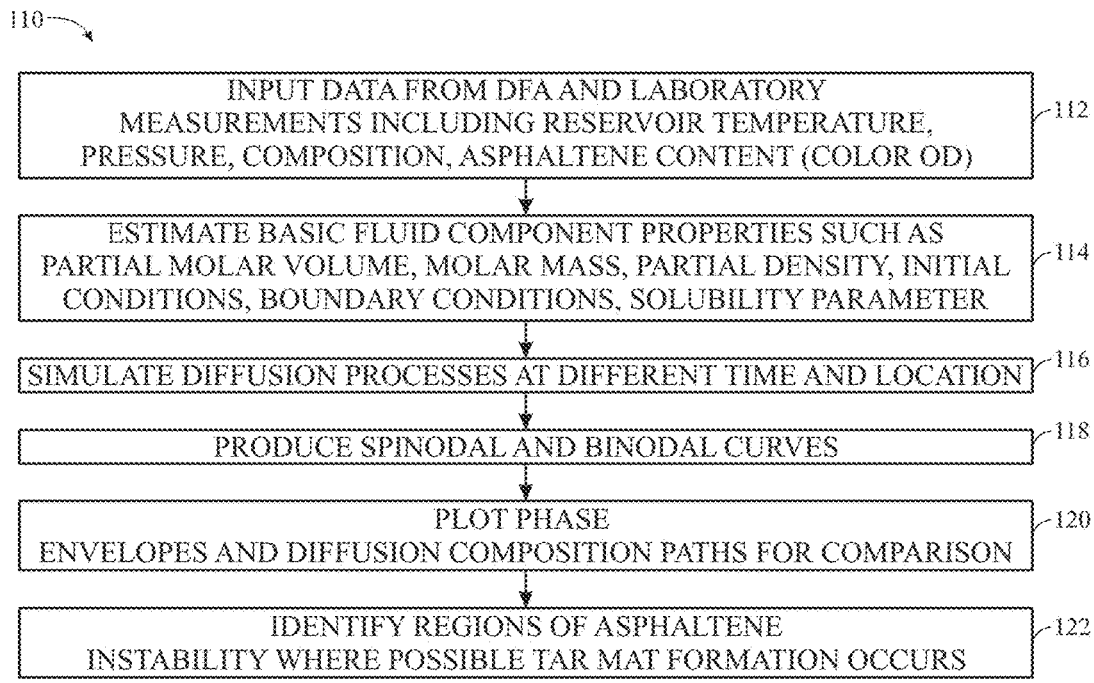
FIG. 3 illustrates an analysis method for identifying possible areas of tar formation in accordance with an embodiment of the present techniques disclosed herein.

FIG. 3 illustrates an analysis method 110 for identifying possible areas of tar formation in accordance with an embodiment of the present techniques disclosed herein. A first step includes inputting (block 112) data from the downhole fluid analysis tool and laboratory measurements including reservoir temperature, pressure, compositions, and asphaltene content. A second step includes estimating (block 114) one or more basic fluid component properties such as partial molar volume, molar mass, partial density, initial conditions, boundary conditions, and solubility parameters. A third step includes simulating (block 116) diffusion processes at varying depths, locations, and geologic times. A fourth step includes generating (block 118) spinodal and binodal curves (including phase envelopes) in accordance with the techniques disclosed herein. A fifth step includes plotting (step 120) phase envelope diagrams and diffusion composition paths for comparison. A sixth step includes identifying (step 122) regions of asphaltene instability where possible tar mat formation occurs. The regions of instability may be represented by a visualization that is output for visual analysis.

A 1D diffusive model was derived for an N-component mixture, as described in U.S. Patent Application Ser. No. 62/234,433, entitled "Tar Mat Formation Prediction in Late-Charge Reservoirs," filed on Sep. 29, 2015, which is hereby incorporated by reference in its entirety. The governing equation (N−1 independent variable) is expressed as:

$$\frac{\partial C}{\partial t} = \nabla(C_t[D]\nabla x) = \nabla(C_t[B]^{-1}[\Gamma]\nabla x) \qquad (1)$$

where C and x are the vectors of the molarity (molar concentration) and mole fraction, t and $C_t$ denote the time and total molarity. The matrix [B] of the drag effects is given by the following expression of the Maxwell-Stefan diffusivities ($D_{ij}$ for the i-j pair diffusivity):

$$B_{ii} = \frac{x_i}{D_{iN}} + \sum_{\substack{k=1 \\ k \neq i}}^{N} \frac{x_k}{D_{ik}}, \quad B_{ij(i \neq j)} = x_i\left(\frac{1}{D_{iN}} - \frac{1}{D_{ij}}\right), \qquad (2)$$

$$i, j = 1, 2, \ldots, N-1$$

The thermodynamic non-ideality of the mixture is computed by using the derivatives of the activity coefficients, which will be described in further detail below.

$$\Gamma_{ij} = \Delta_{ij} + x_i \frac{\partial \ln \gamma_i}{\partial x_j} \quad i, j = 1, 2, \ldots, N-1 \qquad (3)$$

where $\gamma_i$ and $\Delta_{ij}$ are the activity coefficient of component i and the Kronecker delta function for the i-j component pair. As described herein, molarity can be converted to mole fraction by use of the following expression:

$$x_i = C_i v = \frac{C_i v v_N}{v_N} = \frac{C_i v v_N}{v - \sum_{k=1}^{N-1} x_k(v_k - v_N)} = \frac{C_i v_N}{1 - \sum_{k=1}^{N-1} C_k(v_k - v_N)} \qquad (4)$$

$$i = 1, 2, \ldots, N-1$$

where the total molar volume (v) is calculated by the summation of the mole fraction ($x_k$) multiplied by the component partial molar volume ($v_k$):

$$v = \sum_{k=1}^{N} x_k v_k = \sum_{k=1}^{N-1} x_k(v_k - v_N) + v_N \qquad (5)$$

Initial conditions are set to be homogeneous compositions in the one dimension oil column, i.e., $$C_i(0,z) = C_i^0, \ i=1, 2, \ldots, N \qquad (6)$$

The boundary conditions are given as follows. At the base of the oil column (z=0), impermeable boundary conditions are applied:

$$\frac{\partial C_i(t, 0)}{\partial z} = 0, \quad i = 1, 2, \ldots, N-1 \qquad (7)$$

A ternary mixture is taken as an example: gas (1)+ asphaltene (2)+maltene (3), where components 1, 2 and 3 represent the gas, asphaltene, and maltene components, respectively. In the gas cap, pure methane is assumed (a pseudo-gas component can be presumed as well). It may be assumed that the gas component is in equilibrium with oil at the gas/oil contact (GOC) and no asphaltenes move up from the oil column to the gas cap because the gas component does not have solvency capacity to dissolve asphaltenes.

$$C_1 = C_1^{sat}, \text{ and } \frac{\partial C_2(t, GOC)}{\partial z} = 0 \quad (8)$$

Changes to the GOC occur because of the addition of the gas to the oil column resulting in swelling of the column. The changes to the GOC can be estimated by the following equation:

$$z = z^0 + \int_0^t \frac{J_1^{GOC}}{C_1^{GOC-O} - C_1^{GOC-G}} dt \quad (9)$$

where $z^0$ is the initial depth of the GOC. $J_1$ and $C_1$ are the gas flux and molar concentration at the GOC. G and O denote the gas and oil sides.

Initial and boundary conditions can be set differently according to actual situations. By combining the equations above with initial and boundary conditions, composition variations with time in the oil column can be calculated numerically. The calculation is conducted for solving the partial differential equations mentioned above.

As discussed above, gas charges into the reservoir 8 may results in asphaltene phase instability because addition of gas decreases the oil solubility parameters and lowers solvency capacity of the oil to dissolve asphaltenes. Estimating phase envelopes (e.g., phase boundaries) of the mixture of the reservoir fluid may help ensure the asphaltenes are stabilized in oil, as discussed in detail below. Prior to estimating phase envelopes of the reservoir fluid mixture, other measurements associated with the reservoir fluid are taken. The measurements may include reservoir temperature, pressure, compositions, the gas-to-oil ratio (GOR), asphaltene content, density, viscosity, or a combination thereof.

The phase envelopes (e.g., phase boundaries) may include phase instability boundaries including spinodal and binodal boundaries. The spinodal boundary condition may be construed as the limit of local stability with respect to small fluctuations, which is defined by the condition that the second derivative of Gibbs free energy is zero. The binodal boundary condition may be construed as the limit of a global minimum energy equilibrium state of the system. The binodal and spinodal boundaries meet at a critical (plait) point. As discussed in detail below, the methods disclosed herein describe generation of both spinodal and binodal loci.

Spinodal Curve Calculations

As may be appreciated, the spinodal criterion for an N-component system at a specified temperature and pressure is that the determinant of the Jacobian matrix of molar Gibbs free energy is equal to zero:

$$\det \begin{vmatrix} \frac{\partial^2 g}{\partial x_1^2} & \frac{\partial^2 g}{\partial x_1 \partial x_2} & \cdots & \frac{\partial^2 g}{\partial x_1 \partial x_{N-1}} \\ \frac{\partial^2 g}{\partial x_2 \partial x_1} & \frac{\partial^2 g}{\partial x_2^2} & \cdots & \frac{\partial^2 g}{\partial x_2 \partial x_{N-1}} \\ \cdots & \cdots & \cdots & \cdots \\ \frac{\partial^2 g}{\partial x_{N-1} \partial x_1} & \frac{\partial^2 g}{\partial x_{N-1} \partial x_2} & \cdots & \frac{\partial^2 g}{\partial x_{N-1}^2} \end{vmatrix} = 0 \quad (10)$$

where g is the molar Gibbs free energy that is a function of temperature (T), pressure (P) and mole fraction ($x_1$, $x_2$, ..., $x_N$). The molar Gibbs free energy is related to the chemical potential by:

$$g = \sum_{k=1}^{N} x_k \mu_k = \sum_{k=1}^{N-1} x_k (\mu_k - \mu_N) + \mu_N \quad (11)$$

where $\mu_k$ is the chemical potential of component k. Therefore:

$$\frac{\partial g}{\partial x_i} = \mu_i - \mu_N + \sum_{k=1}^{N} x_k \frac{\partial \mu_k}{\partial x_i} \quad (12)$$

According to the Gibbs-Duhem equation in thermodynamics, the last term of Eq. 12 is zero, and $$\sum_{i=1}^{N} x_k \frac{\partial \mu_k}{\partial x_i} = 0 \quad (13)$$

Therefore, $$\frac{\partial^2 g}{\partial x_i \partial x_j} = \frac{\partial \mu_i}{\partial x_j} - \frac{\partial \mu_N}{\partial x_j} \quad (14)$$

Equation (10) may then be rewritten as:

$$\det \begin{vmatrix} \frac{\partial \mu_1}{\partial x_1} & \frac{\partial \mu_1}{\partial x_2} & \cdots & \frac{\partial \mu_1}{\partial x_{N-1}} \\ \frac{\partial \mu_2}{\partial x_1} & \frac{\partial \mu_2}{\partial x_2} & \cdots & \frac{\partial \mu_2}{\partial x_{N-1}} \\ \cdots & \cdots & \cdots & \cdots \\ \frac{\partial \mu_{N-1}}{\partial x_1} & \frac{\partial \mu_{N-1}}{\partial x_2} & \cdots & \frac{\partial \mu_{N-1}}{\partial x_{N-1}} \end{vmatrix} = 0 \quad (15)$$

The chemical potential is further calculated by an activity coefficient model or an equation of state (EOS):

$$\mu_i = \mu_i^0 + RT \ln f_i = \mu_i^{ref} + RT \ln x_i \gamma_i = \mu_i^0 + RT \ln x_i \varphi_i P \quad (16)$$

where superscripts ref and 0 are the reference and standard states, $f_i$, $\gamma_i$ and $\varphi_i$ are the fugacity, activity coefficient, and fugacity coefficient of component i. Thus, Eq. 15 can be expressed as:

$$\det |\Gamma'| = 0 \quad (17)$$

where the matrix $[\Gamma']$ is associated with $[\Gamma]$ in diffusion Equation (1) by:

$$\Gamma'_{ij} = \frac{\Delta_{ij}}{x_i} + \frac{\partial \ln \gamma_i}{\partial x_j} = \frac{\Gamma_{ij}}{x_i} \quad i, j = 1, 2, \ldots, N-1 \quad (18)$$

Therefore, the spinodal instability can be determined directly by evaluating the determinant value of matrix $[\Gamma']$. If $\det|[\Gamma']|<0$, the mixture is unstable. Otherwise, the mixture is stable. If an EOS model is used, the activity coefficients are replaced by the fugacity coefficients.

For a ternary mixture, there are three unknowns ($x_1$, $x_2$ and $x_3$) at a specified temperature and pressure, but there are two equations which include Equation (17) and $x_1+x_2+x_3=1$. Therefore, if the mole fraction of one component is specified, then the other two mole fractions can be determined from these two equations. The Newton method is used to determine spinodal curves at a specified temperature and pressure. As a series of mole fractions of the first component is specified, the mole fractions of the second and third components are calculated using the Newton iteration method with proper initial guesses until Equation (17) and the summation equation are satisfied.

Binodal Boundary Calculations

Binodal (e.g., coexistence equilibrium) curves can be determined in terms of phase equilibrium criteria. As may be appreciated, vapor-liquid-liquid three phase equilibrium (VLLE) criteria are given by:

$$f_i^V = f_i^{L1} = f_i^{L2}, \quad i=1, 2, \ldots, N \quad (19)$$

where $f_i$ is the fugacity of component i and superscripts V, L1 and L2 denote the vapor, liquid 1 and liquid 2 phases. For simplicity, if the non-idealities of the gas phase and two liquid phases are described by the activity coefficient model (e.g., the model parameters are calculated by the cubic equation of state at reservoir conditions), the phase equilibrium criteria can be rewritten as:

$$y_i \gamma_i^V = x_i^{L1} \gamma_i^{L1} = x_i^{L2} \gamma_i^{L2}, \quad i=1, 2, \ldots, N \quad (20)$$

where $y_i$, and $x_i$ are the mole fractions of component i.

For specified reservoir fluid compositions ($z_1, z_2, \ldots, z_N$), a tangent plane distance algorithm is used for phase stability check and a flash algorithm is employed for VLE, LLE and VLLE calculations. Because of convergence in the vicinity of the critical point, Michelsen's phase envelope algorithm is extended to calculate liquid-liquid coexistence curves and plait (critical) points. For LLE, there are N+1 equations which are given by:

$$g_i(\alpha, \beta) = \ln x_i^{L1} + \ln \gamma_i^{L1} - \ln x_i^{L2} - \ln \gamma_i^{L2} = \ln K_i + \ln \gamma_i^{L1} - \ln \gamma_i^{L2} = 0, \quad i=1, 2, \ldots, N \quad (21)$$

where $K_i$ is the equilibrium constant which is dependent on temperature, pressure and compositions. The $(N+1)^{th}$ equation is the Rachford-Rice equation given by:

$$g_{N+1}(\alpha, \beta) = \sum_{i=1}^{N}(x_i^{L1} - x_i^{L2}) = \sum_{i=1}^{N} \frac{(K_i-1)z_i}{1+F(K_i-1)} = 0 \quad (22)$$

where F is the mole fraction of the L1 phase. Adding one more specification equation:

$$g_{N+2}(\alpha, \beta) = \alpha_k - S = 0 \quad (23)$$

The vector of specified variables are given by:

$$\beta^T = (F, T, P) \quad (24)$$

The vector of dependent variables are:

$$\alpha^T = (\ln K_1, \ln K_2, \ldots, \ln K_N, \ln z_j, \ln z_m) \quad (25)$$

Let $z_m$ be a specified variable and $z_j$ one of the primary variables, the remaining compositions are calculated by:

$$z_i = \frac{(1-z_m-z_j)z_i^0}{1-z_m^0-z_j^0}, \quad i \neq j, m \quad (26)$$

which yields the following equation for a ternary system:

$$z_i = 1 - z_m - z_j, \quad i \neq j, m \quad (27)$$

where superscript 0 stands for the initial global compositions of components i, j and m.

Because the Newton-Raphson method is used to solve the set of nonlinear equations, good initial guesses are useful. Therefore, the same extrapolation method is utilized as Michelsen. A polynomial extrapolation is used to obtain a good initial estimation for $k^{th}$ iteration:

$$\alpha_k(S) = \alpha_{k0} + \alpha_{k1}S + \alpha_{k2}S^2 + \alpha_{k3}S^3 \quad (28)$$

where $\alpha_{kj}$, j=0, 1, ..., 3, are the coefficients of the polynomial regressed from the information of the last two points. This extrapolation method utilizes two points at the beginning. Therefore, the LLE flash algorithm is used to generate the first point. A slight composition change is made for component m to obtain the second point. Equation (28) is then used afterward. At plait (critical) points, $K_i=1$ for i=1, 2, ..., N.

Activity Coefficient Model

The activity coefficient is calculated by the Flory-Huggins regular solution model:

$$\ln \gamma_i = \ln \frac{v_i}{v} + 1 - \frac{v_i}{v} + \frac{v_i}{RT} \sum_{j=1}^{N} \sum_{k}^{N} \phi_j \phi_k [(\delta_i - \delta_j)^2 + 2l_{ij}\delta_i \delta_j - 0.5(\delta_j - \delta_k)^2 - l_{jk}\delta_j \delta_k] \quad (29)$$

where $\delta$ is the solubility parameter and $l_{jk}$ is the binary interaction parameter between components j and k. For pure component j, $l_{jj}=0$. If $l_{jk}=0$, the Equation (29) is reduced to:

$$\ln \gamma_i = \ln \frac{v_i}{v} + 1 - \frac{v_i}{v} + \frac{v_i(\delta_i - \delta)^2}{RT} \quad (30)$$

$$\delta = \sum_{i=1}^{N} \phi_k \delta_k \quad (31)$$

$$\phi_i = \frac{x_i v_i}{\sum_{i=1}^{N} x_k v_k} \quad (32)$$

$$v = \sum_{i=1}^{N} x_k v_k \quad (33)$$

Applications

In one example, the reservoir temperature and pressure are set to 339 K and 30 MPa. The density and partial molar volume of gas and maltenes are calculated by the Peng- Robinson equation of state. The saturated gas solubility in maltenes at the reservoir condition is calculated by the Peng-Robinson equation of state, which is equal to 0.575. The solubility parameters of gas and maltene components are calculated by:

$$\delta_i = 17.347 \rho_i + 2.904 \tag{34}$$

where $\rho_i$ is the density of component i in g/cm$^3$ and $\delta_i$ is the solubility parameter of component i in MPa$^{0.5}$. The solubility parameter of asphaltenes in MPa$^{0.5}$ is calculated by:

$$\delta = \delta_0(1 - 1.07 \times 10^{-2}(T - 298.15)) \tag{35}$$

where $\delta_0$ is 21.85 MPa$^{0.5}$ for asphaltenes and T is the temperature in K.

Asphaltenes are present in the oil as nanoaggregates for black oil. According to the Yen-Mullins model, the size of asphaltene nanoaggregates is 2 nm, thus corresponding to molar volume of 2523 cm$^3$/mol and molar mass of 3027 g/mol if density is 1.2 g/cm$^3$.

It is assumed that the basic parameters of each components are constant at the specified reservoir pressure and temperature as given in Table 1. The 100-m oil column initially has homogeneous mole fractions for substantially all the components as shown in column 1 of Table 1, and the gas cap has pure methane at the beginning. At the GOC, no asphaltene flux is presumed because pure methane in the gas cap does not have solvency capacity to dissolve any asphaltenes and the saturated methane mole fraction is 0.575.

| Component | Initial composition mol % | Molecular weight g/mol | Specific gravity | Partial molar volume cm$^3$/mol | Solubility parameter MPa$^{0.5}$ |
|---|---|---|---|---|---|
| Methane | 33.16 | 16 | 0.314 | 51 | 8.35 |
| Maltene | 66.66 | 191 | 0.84 | 227 | 17.48 |
| Asphaltene | 0.28 | 3027 | 1.2 | 2523 | 20.89 |

Table 1 Fluid Data at 339 K

The methane migration diffusion coefficients in source rocks is estimated ~$1.62 \times 10^{-11}$ m$^2$/s, and is used as diffusion coefficient for methane-maltene pair: $D_{13} = D_{31} = 1.62 \times 10^{-11}$ m$^2$/s. A measured methane diffusion coefficient of (~$1.3 \times 10^{-10}$ m$^2$/s) in Athabasca bitumen at 50-75° C. and 8 MPa. Due to tortuosity of porous media, diffusion coefficients in typical sandstones is ~10 times lower than those in free volume. Therefore, the diffusion coefficient is estimated for methane-asphaltene pair as $D_{12} = D_{21} = 0.9 \times 10^{-11}$ m$^2$/s in porous media. Because there is no data available for maltene-asphaltene pair in the open literature, the diffusion coefficient for maltene-asphaltene pair is estimated at $D_{23} = D_{32} = 0.5 \times 10^{-11}$ m$^2$/s in porous media.

The diffusion model is at first used to simulate the gas charge process into the oil column. Adjusting $l_{13} = l_{31} = -0.01$ in the activity coefficient model to match saturated gas solubility in maltenes to be equal to 0.575, which is the same as the value obtained by the Peng-Robinson equation of state. $l_{12} = l_{21} = 0.01$, and $l_{23} = l_{32} = -0.015$. It is observed that density inversion is generated due to the gas charge into the oil column. The extent of density inversion depends on initial asphaltene concentration. The higher asphaltene content the larger density inversion. If the initial asphaltene mole fraction is set to 0.0024 (5.4 wt %), the maximum density inversion is <1 kg/m$^3$ whereas if it is set to 0.0028 (6.0 wt %), the maximum density inversion is 3.0 kg/m$^3$. Increasing initial asphaltene content further results in asphaltene instability, which will be discussed in detail thereafter.

At the GOC, fluid density is much lower than the initial fluid density because higher equilibrium gas concentration lowers fluid density. At a given time, the fluid density increases rapidly (e.g., almost linearly) and reaches a maximum point where fluid density is slightly ($\Delta\rho \approx 3.0$ kg/m$^3$) higher than the initial fluid density. Then the fluid density gradually decreases below the initial density value and subsequently increases to the initial density value. Thus, fluid density inversion is created. The density inversion generated by the gas charge can induce density driven convention (e.g., gravity currents), thus moving asphaltenes down to the base of the oil column. The fluid density inversion over time scale can be seen in FIG. 4. It may be appreciated that asphaltene phase instability may occur during the gas charge process, which depends on conditions. Therefore, it is helpful to analyze asphaltene phase instability thermodynamically.

Figure 4:
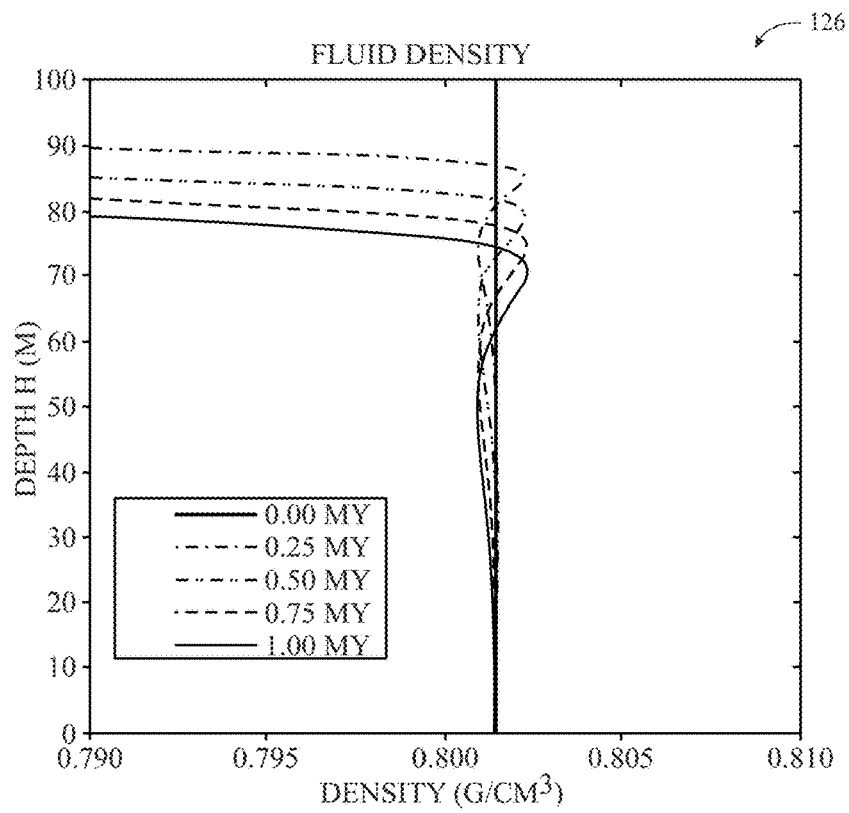
FIG. 4 illustrates density inversion of the simulated fluid density variation with depth at different times with initial asphaltene mole fraction of 0.0024 in accordance with an embodiment of the present techniques disclosed herein.
Figure 5:
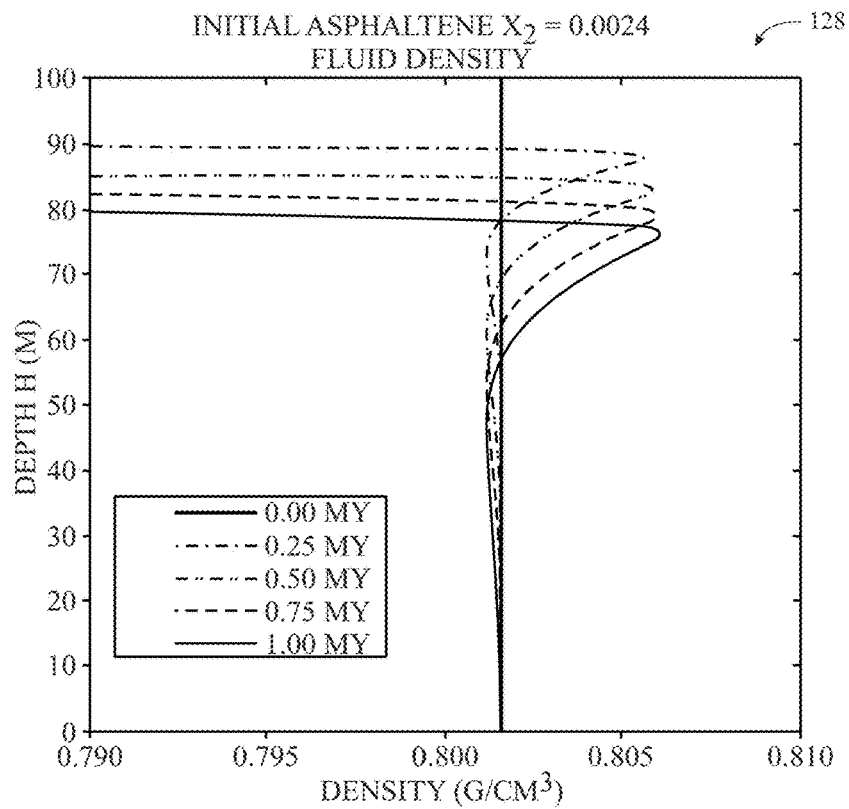
FIG. 5 illustrates density inversion of the simulated fluid density variation with depth at different times with initial asphaltene mole fraction of 0.0028 in accordance with an embodiment of the present techniques disclosed herein.

As shown in FIG. 4, the density inversion of the simulated fluid density variation with depth at different times with initial asphaltene mole fraction of 0.0024 is shown by plot 126. As shown in FIG. 5, the density inversion of the simulated fluid density variation with depth at different times with initial asphaltene mole fraction of 0.0028 is shown by plot 128. The larger density inversion can be observed by the larger asphaltene mole fraction as generated by the diffusion model.

Phase Instability Analysis

Figure 6:
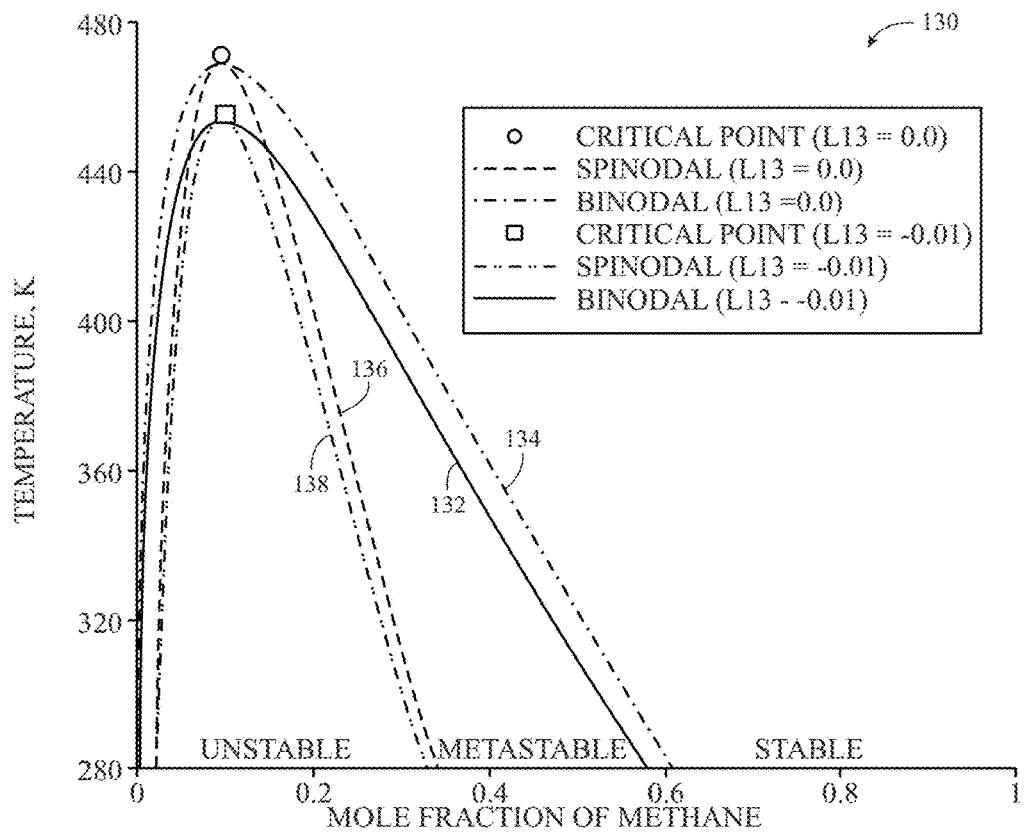
FIG. 6 depicts the binodal and spinodal curves for a methane and maltene mixture in accordance with an embodiment of the present techniques disclosed herein.
Figure 7:
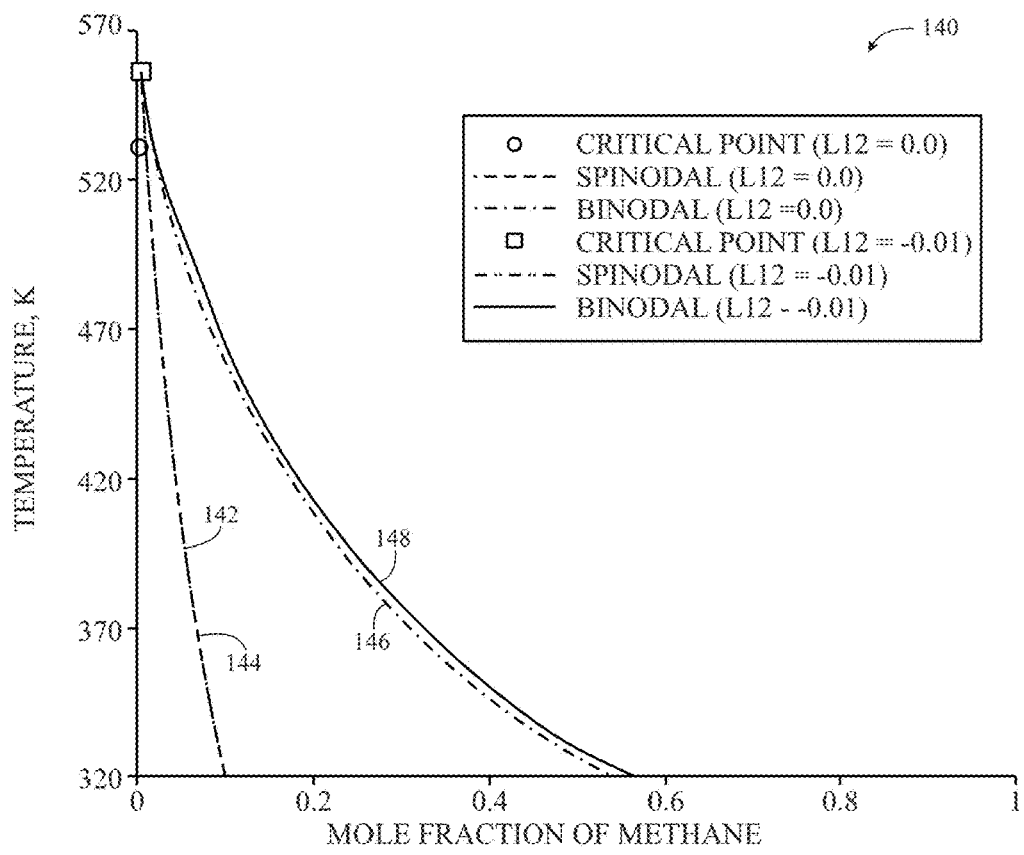
FIG. 7 depicts the binodal and spinodal curves for a methane and asphaltene mixture in accordance with an embodiment of the present techniques disclosed herein
Figure 8:
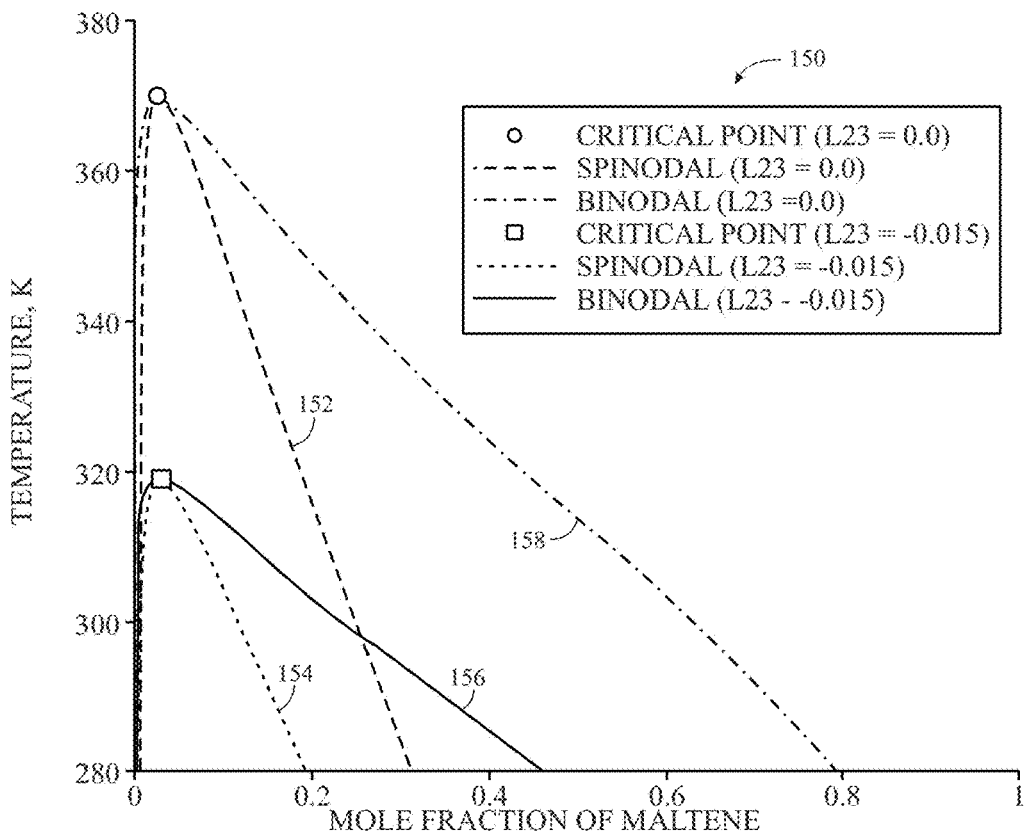
FIG. 8 depicts the binodal and spinodal curves for a maltene and asphaltene mixture in accordance with an embodiment of the present techniques disclosed herein.

The phase diagrams of the three constitutive binary mixtures for the ternary system described herein are calculated using the methods described above. The calculated binodal and spinodal curves are shown in FIGS. 6-8. In general, the mixtures stay in a single stable phase outside the binodal curves. These binodal curves are also called the coexistence curves. The mixtures are separated into two distinct phases inside the spinodal curves, which may be referred to as spinodal decompositions, where a new phase is formed spontaneously. It may be appreciated that the metastable region is inbetween the binodal and spinodal curves.

To check the sensitivity of phase diagrams to the binary interaction parameters in the activity coefficient model for the three binary mixtures, the phase diagrams with and without binary interaction parameters are generated for comparison as shown in FIG. 4. It can be seen that positive binary interaction parameters enlarge metastable and unstable regions whereas negative values decrease metastable and unstable regions. FIG. 6 depicts the binodal and spinodal curves for three binary mixtures. For example, lines 136 and 138 illustrate spinodal curves for a methane and maltene mixture 130, while lines 132 and 134 illustrate binodal curves for the methane and maltene mixture 130. FIG. 7 depicts lines 148 and 144 illustrate spinodal curves for a methane and asphaltene mixture 140, while lines 146 and 148 illustrate binodal curves for the methane and asphaltene mixture 140. FIG. 8 depicts lines 152 and 154 illustrate spinodal curves for a maltene and asphaltene mixture 150, while lines 156 and 158 illustrate binodal curves for the maltene and asphaltene mixture 150.

It may be appreciated that $l_{ij}$ binary interaction parameter in the regular solution model is essentially a correction to the geometric mean rule for the cohesive energy density (or to the solubility parameter). The geometric mean rule assumes to be strictly valid for non-polar molecules according to the London theory. Thus, this $l_{ij}$ is similar to familiar $k_{ij}$ in cubic equations of state. Unfortunately, in most cases, the $l_{ij}$ parameter cannot be correlated with physical properties of the compounds in mixtures. However, some rough approximations have been proposed for aromatic-saturated hydrocarbon mixtures, where $l_{ij}$'s are in a range of −0.03 to 0.015. As mentioned previously, $l_{13}=l_{31}=-0.01$ was obtained by matching the saturated gas solubility in maltenes at the GOC ($x_1=0.575$).

It may be appreciated that maltene and asphaltene components can be completely miscible at any given compositions as shown in the mixture 150 when temperature above 320 K by changing $l_{23}=l_{32}$ from 0 to −0.015. It can be seen that the immiscible region has very high asphaltene contents ($x_2 > 0.4$ when T >320 K with zero $l_{23}$, corresponding to >90 wt % asphaltenes). Oil with such high asphaltene concentration (>90 wt %) is not very mobile owing to high viscosity. Asphaltene content from core extraction in the tar mat zone is around 60 wt %. The immiscible region is not anticipated for maltenes-asphaltenes without gas in reservoirs. Therefore, it is plausible to set a negative $l_{23}=l_{32}$. As such, it is estimated that $l_{23}=l_{32}=-0.015$ and $l_{12}=l_{21}=0.01$.

Figure 9:
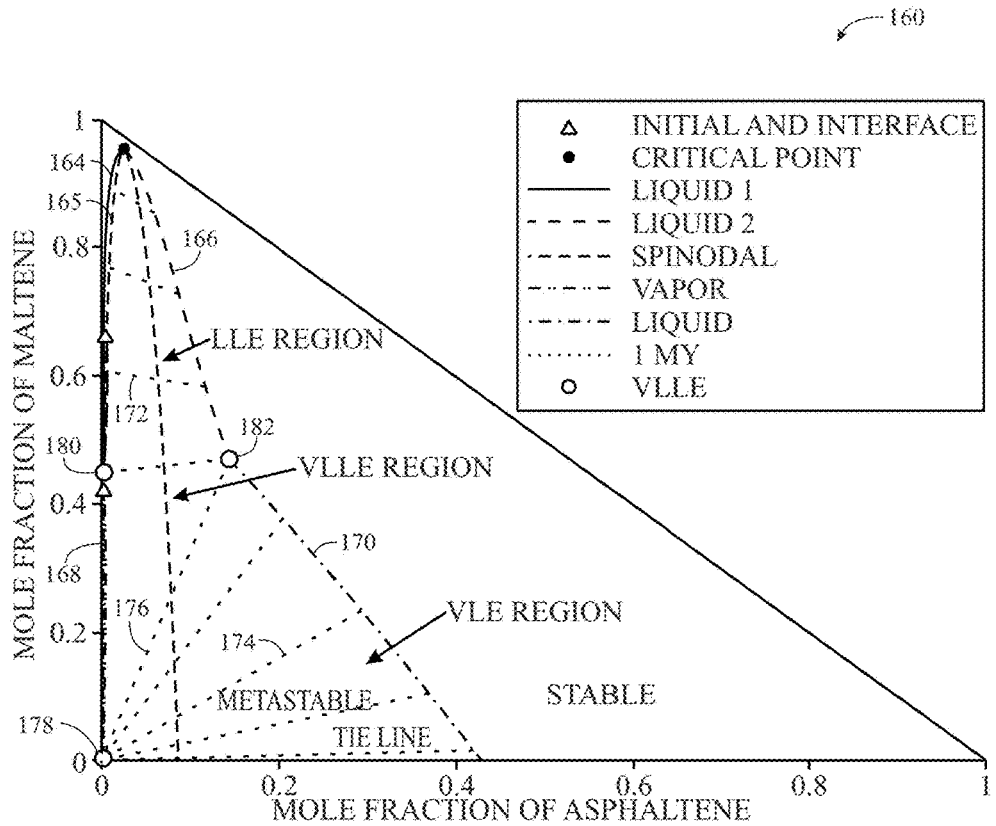
FIG. 9 depicts a calculated ternary diagram for a ternary mixture including gas, maltene in accordance with an embodiment of the present techniques disclosed herein.

For a ternary (gas+maltene+asphaltene) mixture 160, the calculated ternary diagram is given in FIG. 9 with $l_{12}=l_{21}=0.002$, $l_{13}=l_{31}=l_{23}=l_{32}=-0.002$. In FIG. 9, line 165 is the spinodal curve. The remaining solid curves are binodal curves. Lines 164 and 166 illustrate binodal curves, including liquid-liquid equilibrium (LLE) curves on the top left and lines 168 and 170 illustrate binodal curves, including vapor-liquid equilibrium (VLE) curves close to the origin and on the bottom right. Tie-lines 172, 174, and 176 are also drawn for the LLE region, the VLE region, and the VLLE region. There is a three phase vapor-liquid-liquid equilibrium region on the bottom left inside the three open circles. In this region any compositions are separated into three vapor-liquid-liquid phases and the three phase compositions are located at the three open circles (e.g., 178, 180, 182). According to the Gibbs phase rule, the degree of freedom for this ternary system is given by: F=C−P+2=2 where C=3 (e.g., 3 components), P (e.g., 3 phases). If temperature and pressure are specified, then, F=0 (i.e., no degrees of freedom). Thus, the three phase equilibrium compositions are fixed at the reservoir temperature and pressure. Again, the stable single phase region is outside the binodal curves. The unstable region is inside the spinodal curves and the metastable region is inbetween the binodal and spinodal curves. It should be noted that $l_{23}=l_{32}=-0.002$ can avoid the immiscible region for binary maltene-asphaltene mixture at the specified reservoir condition, i.e., no spinodal and binodal curves close to the hypotenuse on the right-hand side.

Figure 10:
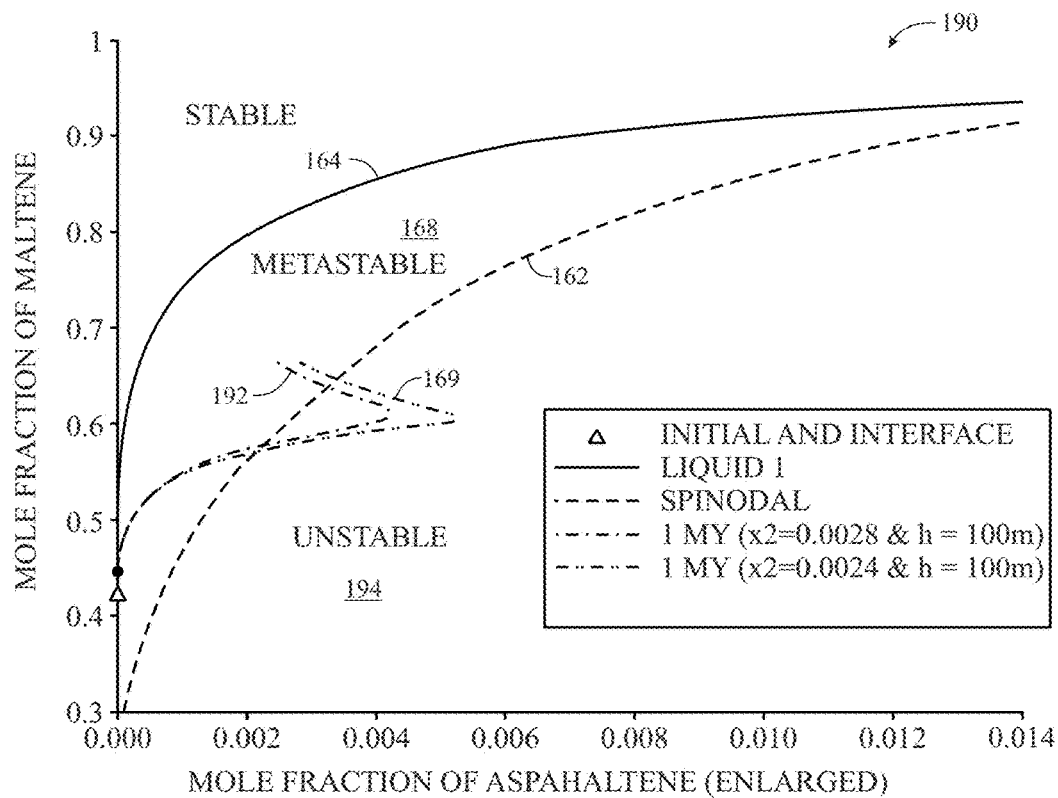
FIG. 10 depicts an enlarged view of FIG. 9 in accordance with an embodiment of the present techniques disclosed herein.

FIG. 10 is an enlarged view of FIG. 9. It can be seen that the simulated compositions are very close to the top-left side owing to very low asphaltene mole fractions. Line 162 represents the spinodal curve. The simulated composition paths of the diffusion are in the metastable and unstable region for initial asphaltene mole fractions of 0.0028 (e.g., line 169) and 0.0024 (e.g., line 192) in the 100-m thick oil column over 1 million years. Asphaltenes start to precipitate at the GOC because the mixture is in the metastable region 168 and then quickly falls into the unstable region (across the spinodal boundary 194).

Figure 11:
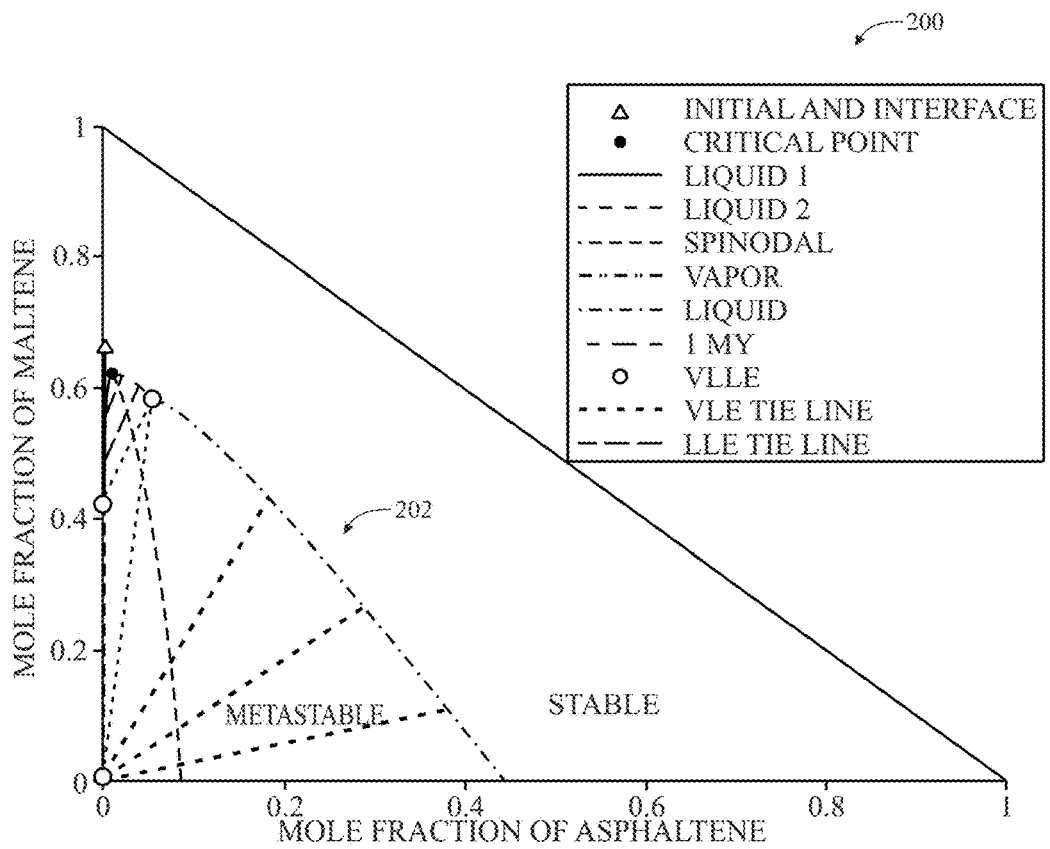
FIG. 11 depicts a calculated ternary diagram for a ternary mixture including gas, maltene in accordance with an embodiment of the present techniques disclosed herein.
Figure 12:
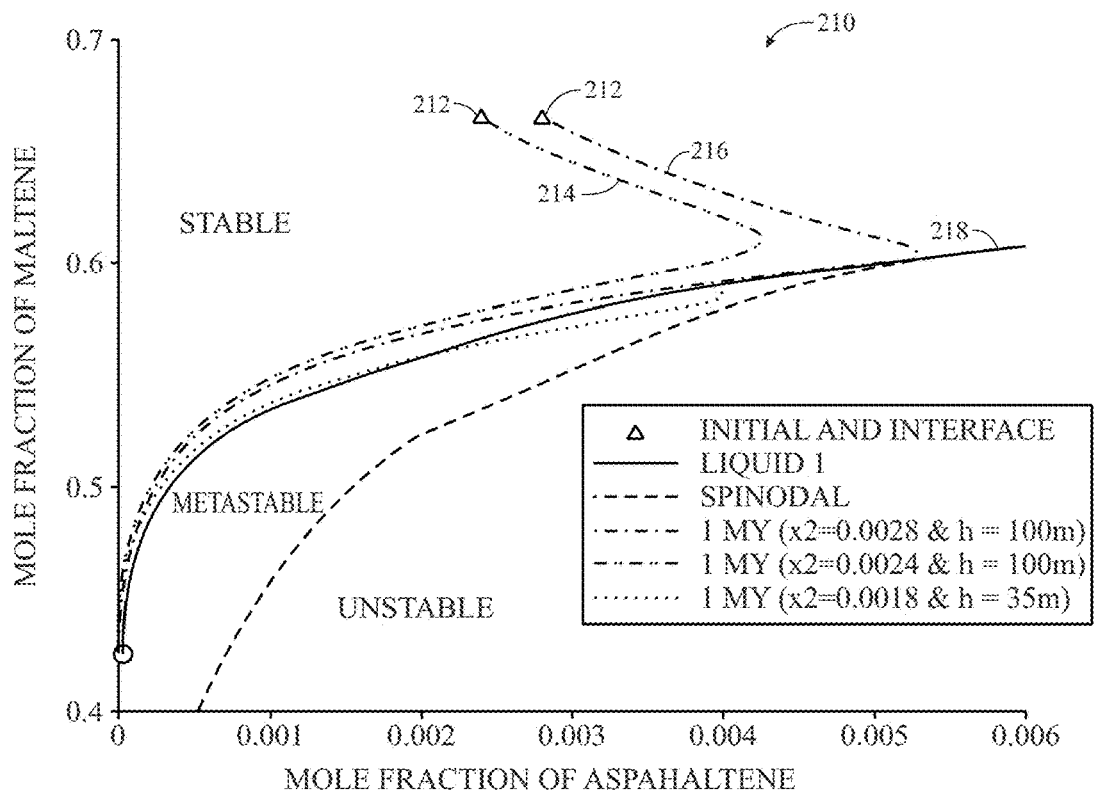
FIG. 12 depicts an enlarged view of FIG. 11 in accordance with an embodiment of the present techniques disclosed herein.

To analyze sensitivity of ternary phase diagrams to the $l_{ij}$'s, the calculated ternary diagram is illustrated in FIG. 11 with $l_{12}=l_{21}=0.01$, $l_{13}=l_{31}=-0.01$, $l_{23}=l_{32}=-0.015$. With this set of parameters, the liquid-liquid equilibrium region is smaller compared to the ternary diagram in FIGS. 9-10 mainly because of $l_{23}=l_{32}=-0.015$ from $l_{23}=l_{32}=-0.002$. The vapor-liquid equilibrium region 202 increases and the VLLE three phase equilibrium region decreases. FIG. 12 is the enlarged view of the interesting region from the initial reservoir compositions to the GOC. The simulated compositional paths of the diffusion over 1 million years in the 100-m thick oil column with initial asphaltene mole fractions of 0.0028 (e.g., line 216) and 0.0024 (e.g., line 214) are above the binodal curve (e.g., line 218). That means there are no asphaltene instability issues.

Figure 13:
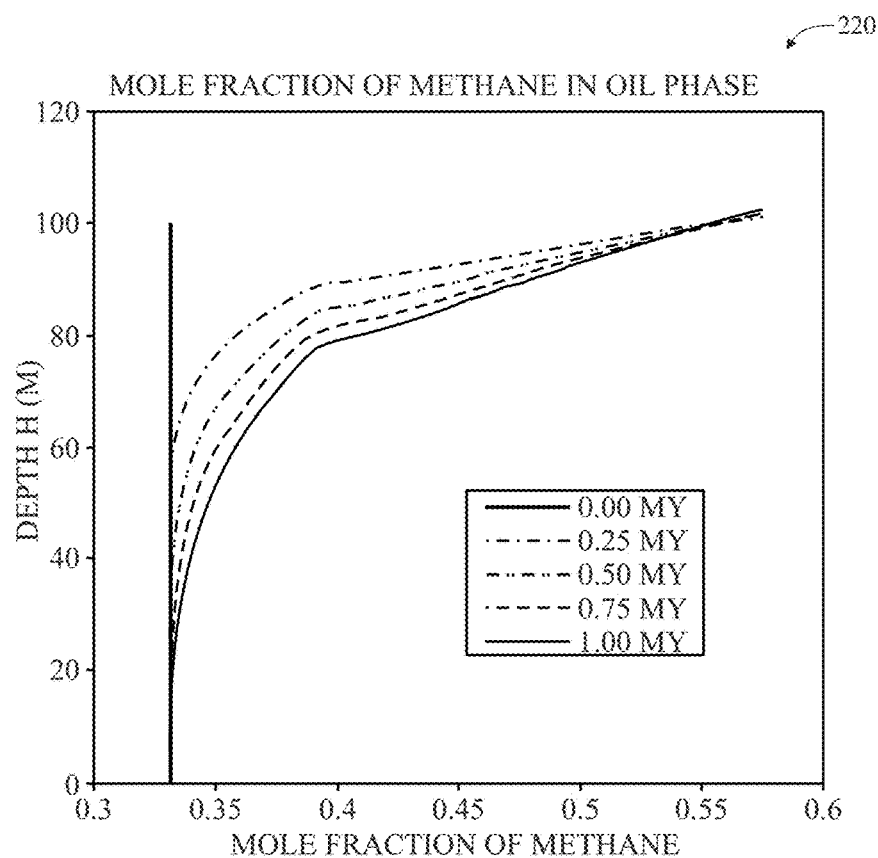
FIG. 13 depicts a methane profile in a 100 m thick column in accordance with an embodiment of the present techniques disclosed herein.
Figure 14:
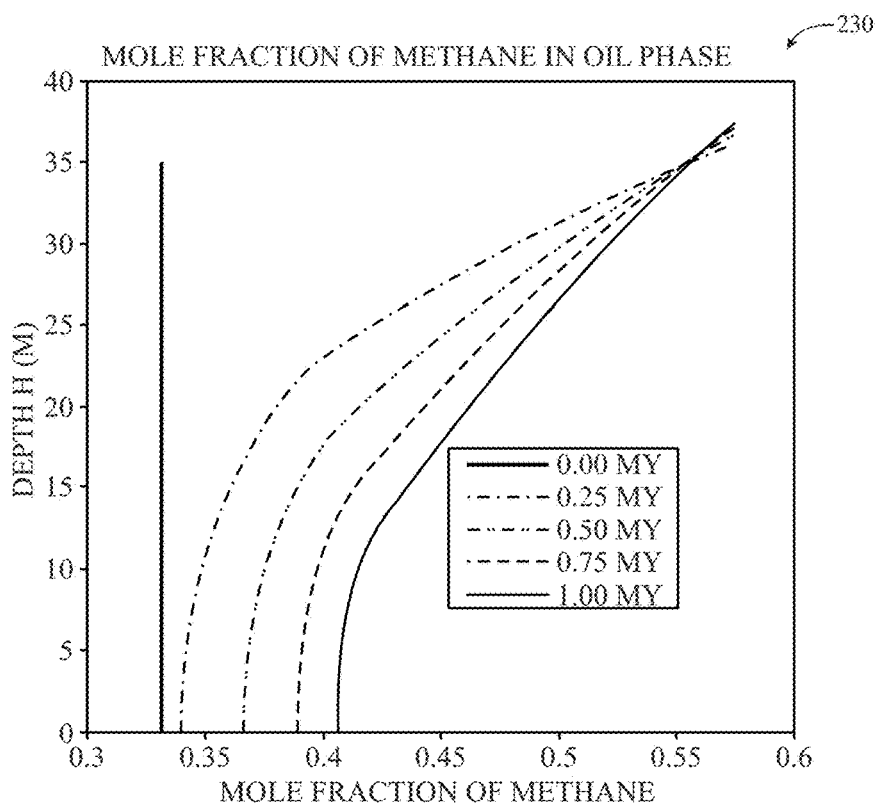
FIG. 14 depicts a methane profile in a 35 m thick column in accordance with an embodiment of the present techniques disclosed herein.
Figure 15:
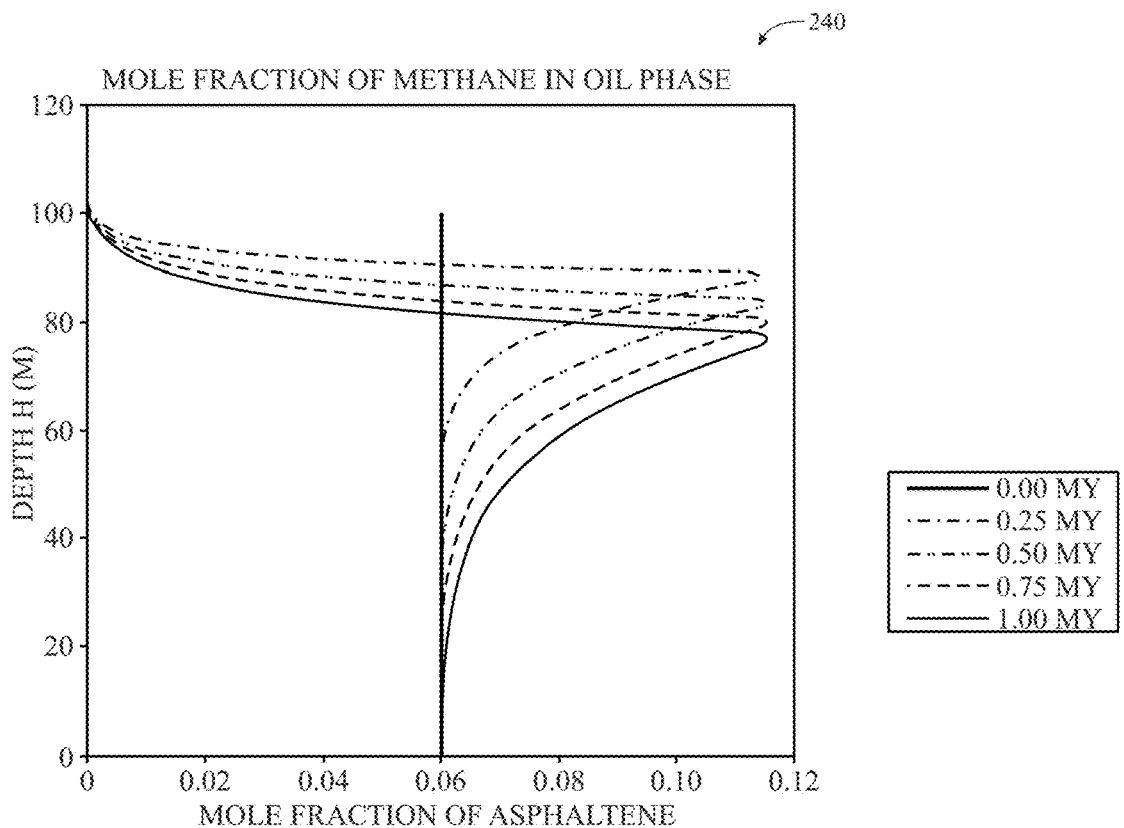
FIG. 15 depicts an asphaltene profile in a 100 m thick column in accordance with an embodiment of the present techniques disclosed herein.

FIGS. 13-16 illustrate methane and asphaltene profile in 100 m and 35 m thick oil columns. When thickness of the oil column is lowered from 100-m thick to 35-m thick, the same parameters are used for both cases. There are no asphaltene instability issues at the top of the oil columns (e.g., profiles 220 and 240) as shown in FIGS. 13 and 15. However, because the thickness of the oil column is much smaller, gas can diffuse down to the base of the oil column. Gas charges lower the oil solvency capacity to dissolve asphaltenes and expel asphaltenes out to the base. Therefore, asphaltenes are accumulated at the base of the 35-m thick oil column after 1 million years. As such, asphaltenes at the base are unstable (e.g., due to spinodal decomposition).

Figure 16:
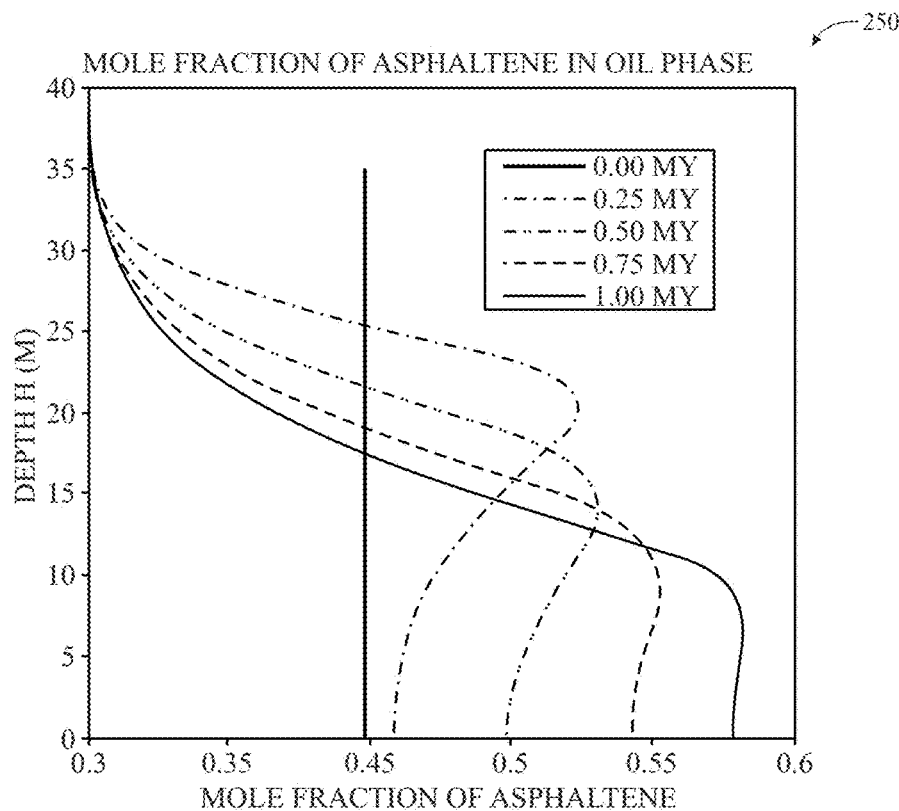
FIG. 16 depicts an asphaltene profile in a 35 m thick column in accordance with an embodiment of the present techniques disclosed herein.

When the initial asphaltene mole fraction from 0.0028 (6.0 wt %) to 0.0018 (4.0 wt %) or the gas charge time for the 35-m thick oil column is shortened, the simulation can be completed. It can be seen that compositional path of the diffusion (e.g., profiles 230 and 250) are below the binodal curve close to the base of the 35 m oil column as shown in FIGS. 14 and 15. The mixtures are in the metastable region. The simulated asphaltene profiles for both 100-m (e.g., profile 240) and 35-m (e.g., profile 250) thick oil columns are shown in FIGS. 15 and 16. The gas front does not reach the base in the 100-m oil column, whereas the gas front goes through the base and causes asphaltene instability, thus yielding a tar mat formation. As mentioned previously, density inversion induced convection moves asphaltenes to the base. If enriched asphaltenes at the base of the oil column exceed the maximum asphaltene solubility in the oil, then a tar mat is formed.

Impacts of Parameters on Spinodal Curves

Figure 17:
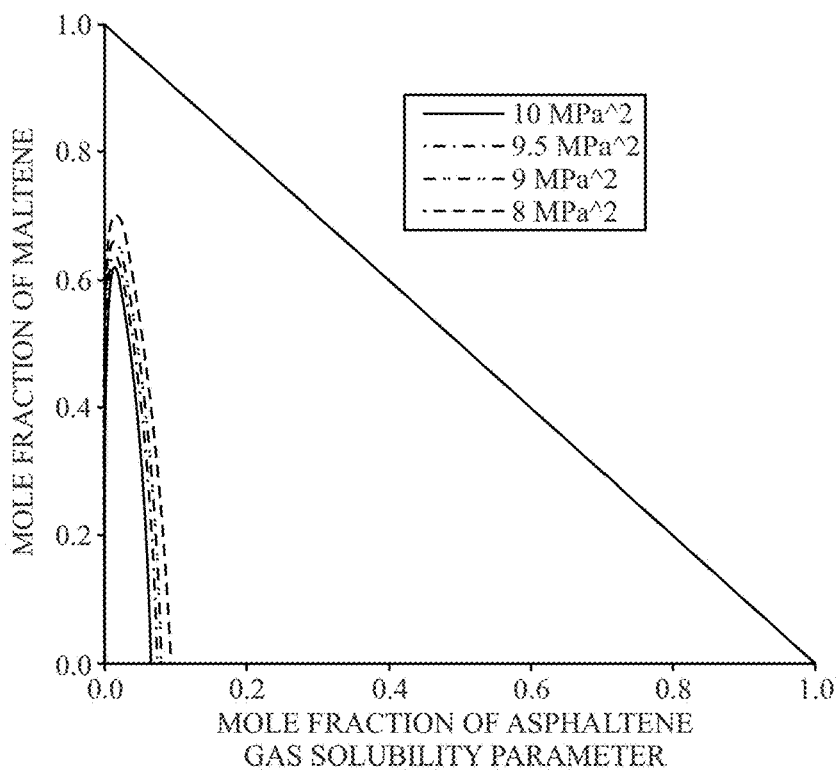
FIG. 17 shows the impact of gas solubility parameters on spinodal curves in accordance with an embodiment of the present techniques.
Figure 18:
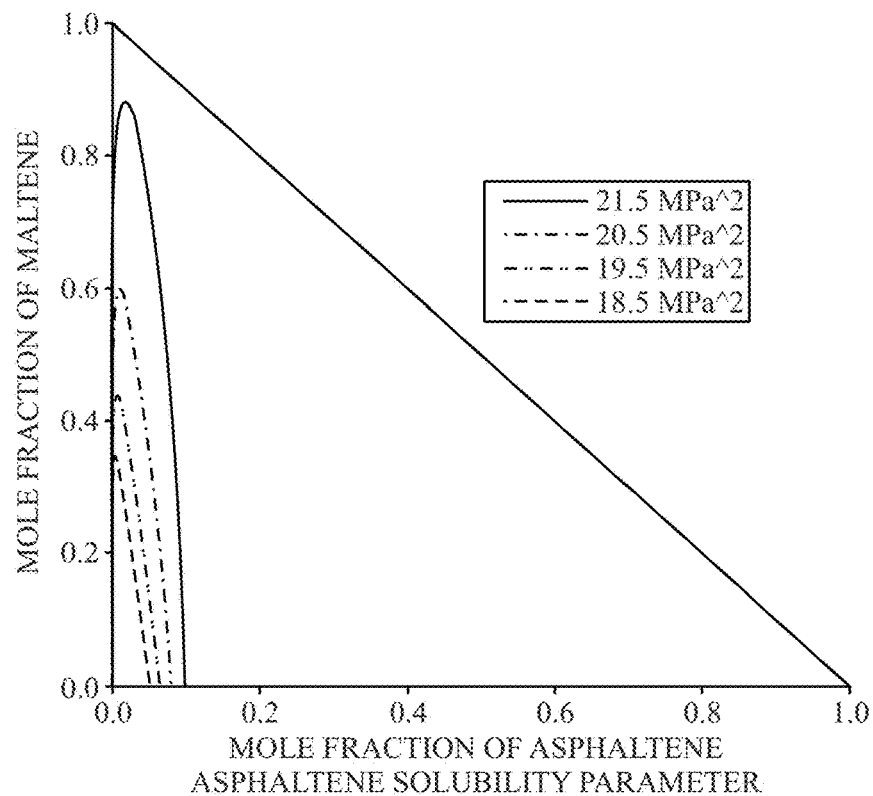
FIG. 18 shows the impact of asphaltene solubility parameters in accordance with an embodiment of the present techniques.
Figure 19:
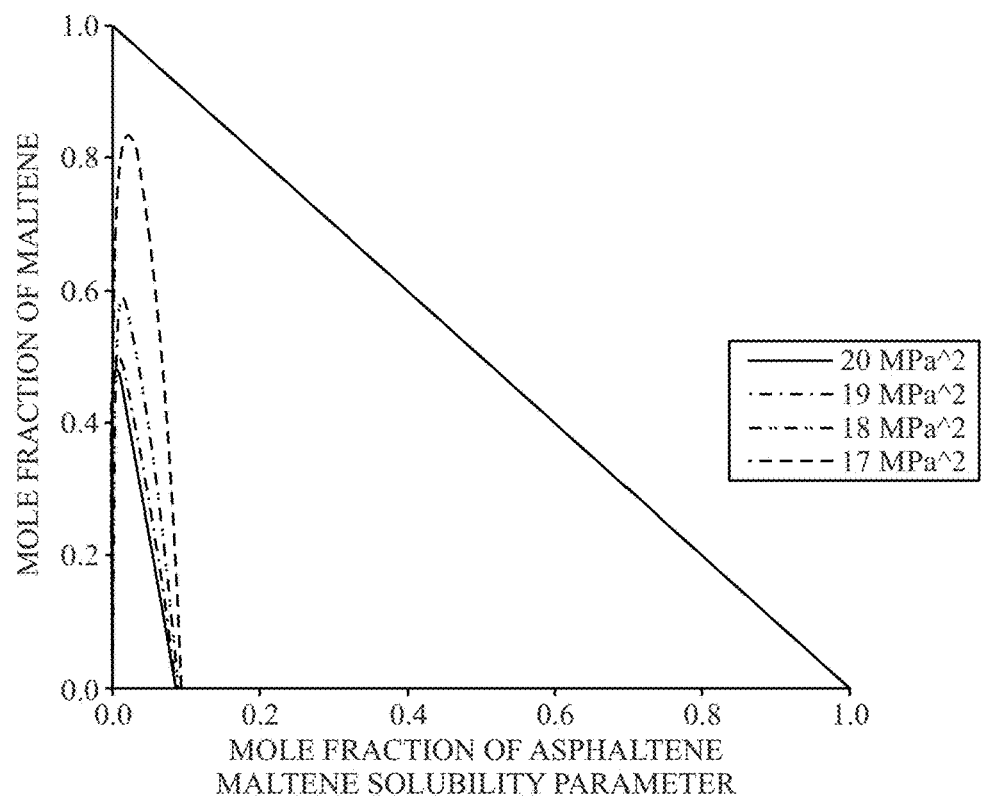
FIG. 19 shows the impact of maltene solubility parameters on spinodal curves in accordance with an embodiment of the present techniques.
Figure 20:
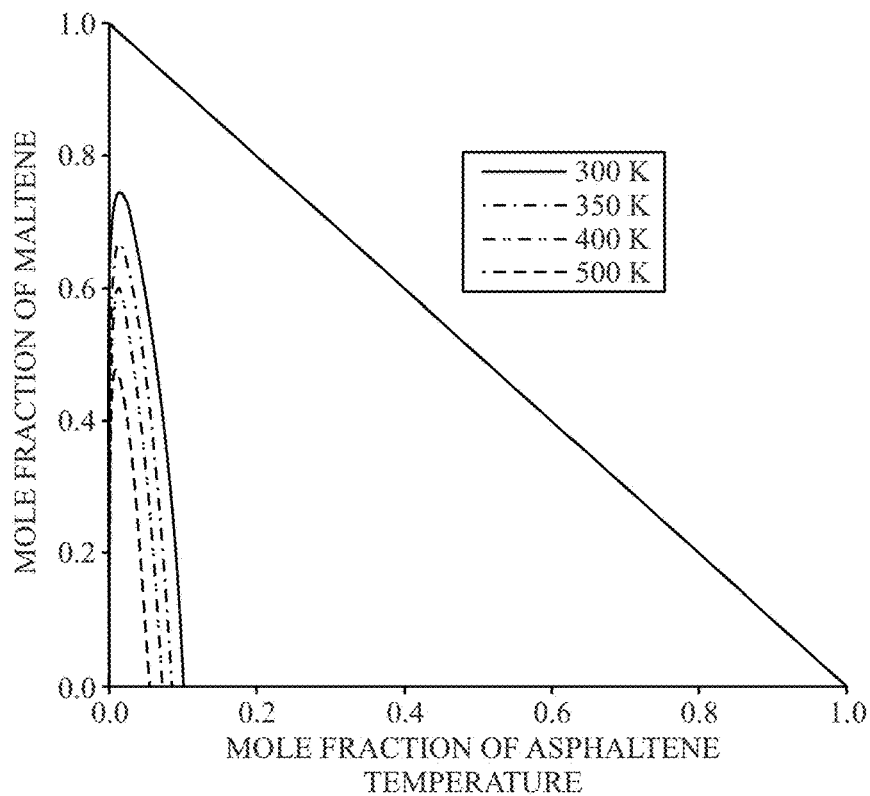
FIG. 20 shows the impact of temperature in accordance with an embodiment of the present techniques.
Figure 21:
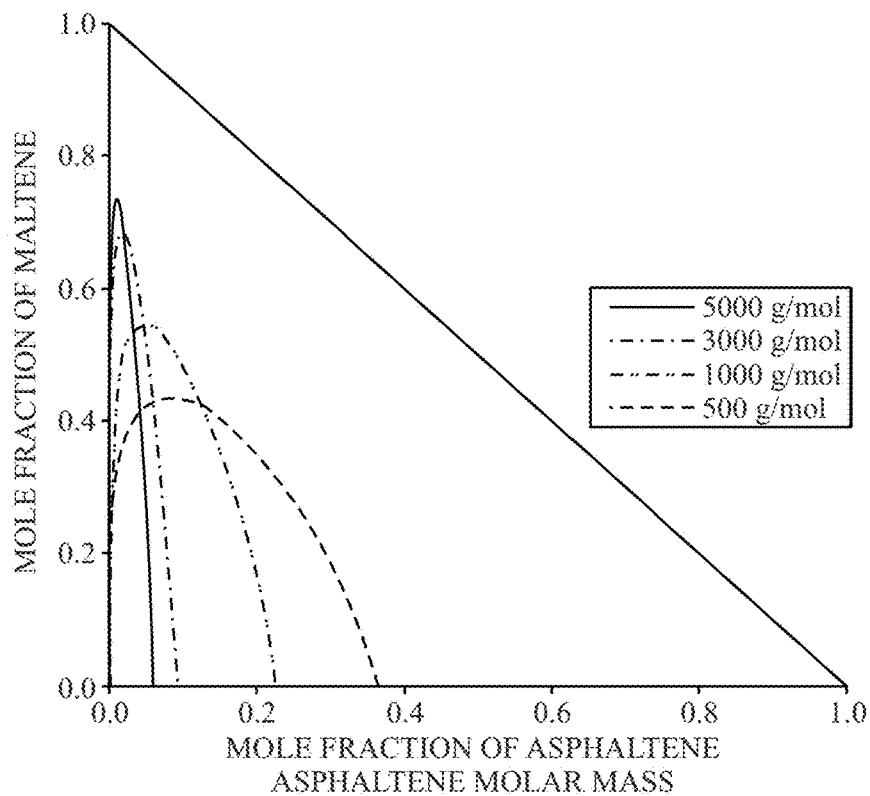
FIG. 21 shows the impact of asphaltene sizes on spinodal curves in accordance with an embodiment of the present techniques.
Figure 22:
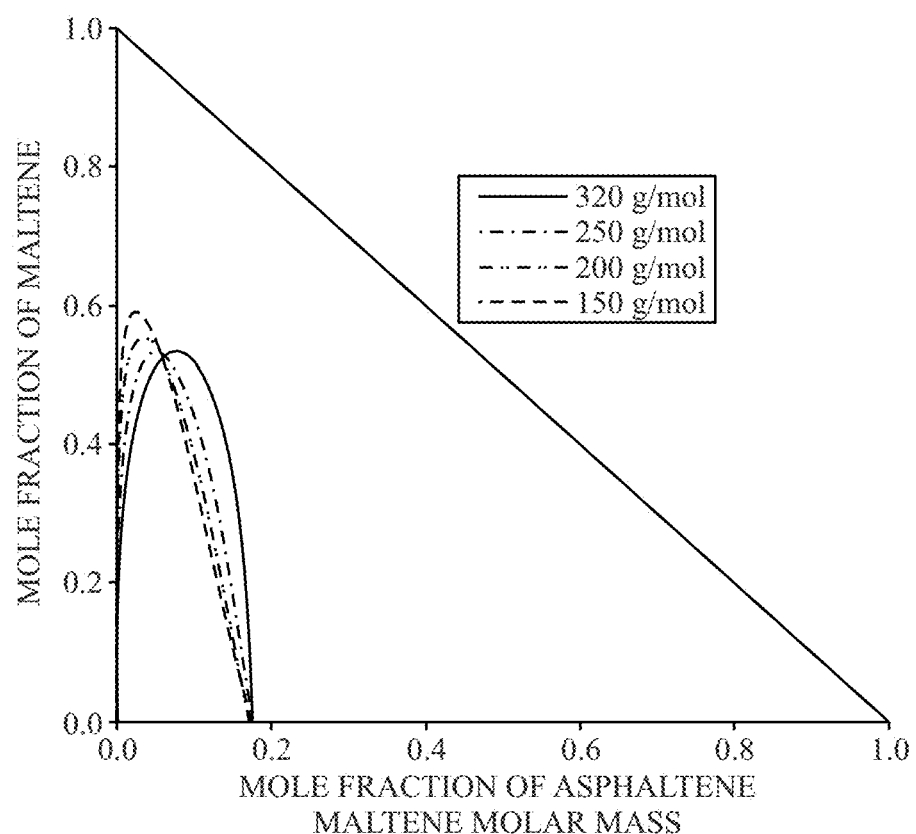
FIG. 22 shows the impact of maltene molar mass on spinodal curves in accordance with an embodiment of the present techniques.

The impact of changing the values of $l_{ij}$'s on the phase diagrams may be further understood with reference to FIGS. 17-22. To some extent, changing the values of the $l_{ij}$'s on the phase diagrams may be equivalent to changing other parameters in the model. The sensitivity analysis is conducted by changing one parameter at a time, while the other parameters are kept unchanged. FIG. 17 shows the impact of gas solubility parameters on spinodal curves. Gas with lower solubility parameters slightly increases the unstable region. The impact of asphaltene solubility parameters is illustrated in FIG. 18. It can be seen that higher asphaltene solubility parameters result in a bigger unstable region. FIG. 19 depicts the effect of maltene solubility parameters on spinodal curves. It can be seen that lower maltene solubility parameters increase the unstable region. This may be further understood as the solubility theory in chemistry applies. In other words, substances with similar solubility parameters can be mutually dissolved. Otherwise they are partially or completely immiscible and separated into different phases. FIG. 20 depicts the effect of temperature. An increase in temperature gives rise to a decrease unstable region. FIG. 21 shows the impact of asphaltene sizes on spinodal curves. Asphaltene molecules with molar mass of ~750 g/mol cause a large spinodal region and increase methane concentration in oil. Thus, generally no asphaltene instability issues exist because reservoir conditions are often far away from the unstable region. Increasing molar mass of asphaltenes (e.g., nanoaggregates) increases chances to have asphaltene instability because spinodal curves reach higher maltene and lower methane concentration regions. FIG. 22 illustrates the impact of maltene molar mass on spinodal curves. Lighter oil slightly shifts the unstable region to the left-hand side.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A method comprising:
   placing a downhole acquisition tool in a wellbore in a geological formation, wherein the wellbore or the geological formation, or both, contain a reservoir fluid;
   performing downhole fluid analysis using the downhole acquisition tool in the wellbore to determine at least one measurement associated with the reservoir fluid; and using a processor to:
   estimate at least one fluid component property by using an equation of state based at least in part on the at least one measurement associated with the reservoir fluid, wherein the at least one fluid component property comprises an initial asphaltene concentration of the reservoir fluid;
   simulate a diffusion process that charges the reservoir fluid with gas using a diffusion model that takes into account the at least one estimated fluid property to generate a composition path, wherein the composition path comprises a fluid density variation with depth having a density inversion based on the initial asphaltene concentration, and wherein generating the composition path comprises calculating a binodal curve and a spinodal curve, using a binary interaction parameter approximated from an aromatic saturated hydrocarbon mixture;
   estimate one or more phase envelopes based at least in part on the at least one fluid property;
   compare the one or more phase envelopes with the composition path; and
   output a visualization on a single plot that identifies potential areas of asphaltene instability between the binodal curve and the spinodal curve, and generating a phase diagram comprising at least three phases that identifies the potential areas of asphaltene instability based on the binodal curve and the spinodal curve, wherein the phase diagram includes a liquid-liquid equilibrium region, a vapor-liquid equilibrium region, and a vapor-liquid-liquid equilibrium region.

2. The method of claim 1, wherein the at least one measurement comprises reservoir temperature data, pressure data, fluid composition data, or any combination thereof.

3. The method of claim 1, wherein the at least one fluid component property comprises partial molar volume, molar mass, partial density, initial conditions, boundary conditions, solubility parameters, or any combination thereof.

4. The method of claim 1, wherein using the diffusion model comprises generating the composition path at varying depths of the geological formation.

5. The method of claim 1, wherein comparing the one or more phase envelopes with the composition path comprises plotting the binodal curve and the spinodal curve against the one or more phase envelopes.

6. The method of claim 1, wherein the areas of asphaltene instability represent areas of potential tar formation.

7. The method of claim 1, wherein the single plot comprises the binodal curve and the spinodal curve plotted as a fluid component mole fraction by temperature, wherein the fluid component is maltene.

8. The method of claim 1, comprising performing a sensitivity analysis of a plurality of parameters implemented within the spinodal curve used in the diffusion model, wherein one of the plurality of parameters is changed at a time while the other parameters are kept unchanged, and wherein the parameters comprise a gas solubility parameter, an asphaltene solubility parameter, a maltene solubility parameter, a temperature, an asphaltene size, and a maltene molar mass.

9. The method of claim 1, wherein the binary interaction parameter is in a range of from −0.03 to 0.015.

10. The method of claim 1, wherein the single plot comprises the binodal curve and the spinodal curve plotted as a fluid component mole fraction by temperature, and wherein the fluid component is methane.

11. The method of claim 1, wherein the single plot is a ternary diagram of a ternary mixture comprising gas, maltene, and asphaltene.

12. The method of claim 1, wherein the simulated diffusion process charges the reservoir fluid with methane.

13. The method of claim 1, wherein the diffusion model utilizes a diffusion coefficient for a maltene-asphaltene pair that is equal to $0.5 \times 10^{-11} m^2/s$ in a porous media.

14. One or more tangible, non-transitory, machine-readable media comprising instructions to:
   receive at least one measurement representative of a portion of a reservoir fluid as analyzed by a data acquisition tool disposed in a wellbore in a geological formation within a hydrocarbon reservoir;
   estimate at least one fluid component property by using an equation of state, wherein the at least one fluid component property comprises an initial asphaltene concentration of the reservoir fluid;
   simulate a diffusion process that charges the reservoir fluid with gas by executing a diffusion model that takes into account the at least one estimated fluid property to generate a composition path, wherein the composition path comprises a fluid density variation with depth having a density inversion based on the initial asphaltene concentration, and wherein generating the composition path comprises calculating a binodal curve and a spinodal curve using a binary interaction parameter approximated from an aromatic saturated hydrocarbon mixture;
   estimate one or more phase envelopes based at least in part on the at least one fluid property;
   compare the one or more phase envelopes with the composition path; and
   output a visualization on a single plot that identifies potential areas of asphaltene instability between the binodal curve and spinodal curve, wherein the single plot is a ternary diagram of a ternary mixture comprising gas, maltene, and asphaltene.

15. The one or more machine-readable media of claim 14, comprising instructions to estimate the at least one fluid component property with empirical historical data associated with the hydrocarbon reservoir.

16. The one or more machine-readable media of claim 14, comprising instructions to execute diffusion model at varying depths of the geological formation to generate multiple composition paths.

17. A system, comprising:

a downhole acquisition tool housing comprising a plurality of sensors configured to measure at least one fluid property of a reservoir fluid within a geological formation of a hydrocarbon reservoir; and a data processing system configured to predict areas of potential asphaltene instability from a visualization that depends at least in part on an instability analysis associated with the at least one measured fluid property, wherein the data processing system comprises one or more tangible, non-transitory, machine-readable media comprising instructions to:

estimate at least one fluid component property by using a suitable equation of state, wherein the at least one fluid component property comprises an initial asphaltene concentration of the reservoir fluid;

simulate a diffusion process that charges the reservoir fluid with gas using a diffusion model that takes into account the at least one estimated fluid property to generate a composition path, wherein the composition path comprises a fluid density variation with depth having a density inversion based on the initial asphaltene concentration, and wherein generating the composition path comprises calculating a binodal curve and a spinodal curve using a binary interaction parameter approximated from an aromatic saturated hydrocarbon mixture, wherein the binary interaction parameter is in a range of from −0.03 to 0.015;

estimate one or more phase envelopes based at least in part on the at least one fluid property;

compare the one or more phase envelopes with the composition path; and output a visualization on a single plot that identifies potential areas of asphaltene instability between the binodal curve and spinodal curve.

18. The system of claim 17, wherein the data processing system is configured to output the visualization at varying depths of the geological formation.

19. The system of claim 18, wherein comparing the one or more phase envelopes with the composition path comprises plotting the binodal curve and the spinodal curve against the one or more phase envelopes.

* * * * *